(12) United States Patent
Ikeda

(10) Patent No.: US 6,631,180 B1
(45) Date of Patent: Oct. 7, 2003

(54) SYSTEM AND METHOD FOR TRANSFERRING A MESSAGE RESPONDING TO AN ANSWER PHONE THROUGH A PACKET NETWORK

(75) Inventor: Saburou Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 530 days.

(21) Appl. No.: 09/598,503

(22) Filed: Jun. 22, 2000

(30) Foreign Application Priority Data

Jun. 25, 1999 (JP) .......................................... 11-179429

(51) Int. Cl.$^7$ ............................................ H04M 1/658
(52) U.S. Cl. ................................ 379/88.17; 379/88.18; 379/88.22; 455/413
(58) Field of Search ............................ 379/67.1, 88.11, 379/88.12, 88.13, 88.17, 88.18, 88.19, 88.2, 88.22, 88.23, 88.24, 88.25; 455/412, 413, 414, 421

(56) References Cited

U.S. PATENT DOCUMENTS

| | | | | |
|---|---|---|---|---|
| 5,278,897 A | * | 1/1994 | Mowery et al. | ....... 379/212.01 |
| 5,627,877 A | * | 5/1997 | Penttonen | ................... 455/413 |
| 5,673,256 A | * | 9/1997 | Maine | ......................... 370/271 |
| 5,751,792 A | * | 5/1998 | Chau et al. | .............. 379/88.17 |
| 5,963,618 A | * | 10/1999 | Porter | ..................... 704/270.1 |
| 6,018,657 A | * | 1/2000 | Kennedy et al. | ......... 455/426.1 |
| 6,188,887 B1 | * | 2/2001 | Joong et al. | ................ 455/417 |
| 6,215,858 B1 | * | 4/2001 | Bartholomew et al. | .. 379/88.17 |
| 6,337,977 B1 | * | 1/2002 | Ranta | ........................ 455/413 |
| 2001/0050978 A1 | * | 12/2001 | Jonsson | ................... 379/88.25 |
| 2002/0039407 A1 | * | 4/2002 | O'Donovan et al. | ....... 379/67.1 |

FOREIGN PATENT DOCUMENTS

JP                3052588              7/1998

* cited by examiner

Primary Examiner—Scott L. Weaver
(74) Attorney, Agent, or Firm—Young & Thompson

(57) ABSTRACT

A telephone $24_1$ transmits an answer-phone-startup request to a portable telephone position storing unit 25. Then the portable telephone position storing unit 25 turns on an answer-phone-startup information for the telephone $24_1$. When a telephone $24_N$ originates a call to telephone $24_1$, exchange $22_N$ inquires of the portable telephone position storing unit 25 whether or not the answer-phone-startup information is turned on for the telephone $24_1$. If the answer-phone-startup information is turned on for the telephone $24_1$, the exchange establishes a connection from telephone $24_N$ to an Internet answer phone-transferring function unit $21_N$ to store a message in unit $21_N$. When the telephone $24_1$ transmits an answer phone reproducing request, the exchange $22_1$ establishes a connection from an Internet answer phone-transferring function unit $21_1$ to the telephone $24_1$. The unit $21_1$ broadcasts a request packet to the other units $21_2 \ldots 21_N$ through the Internet. Units having messages designated to telephone $24_1$ transfer the messages to unit $21_1$ in response to the request packet. The unit $21_1$ transmits the retrieved messages to telephone $24_1$.

3 Claims, 14 Drawing Sheets

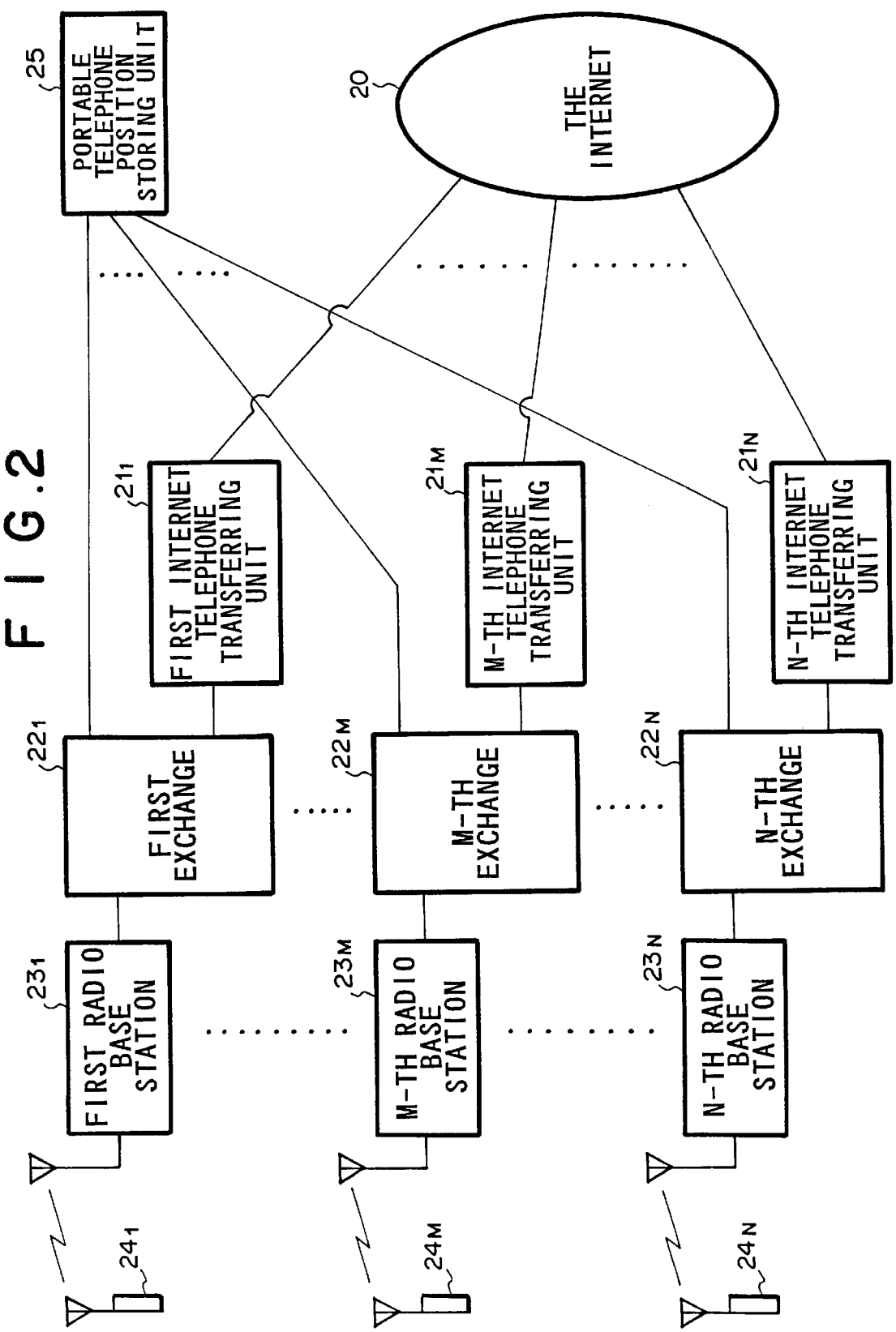

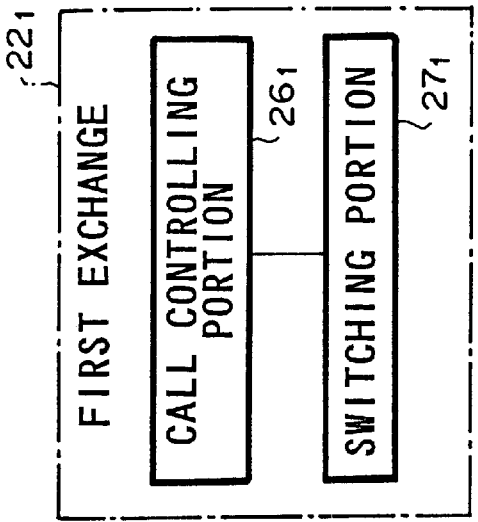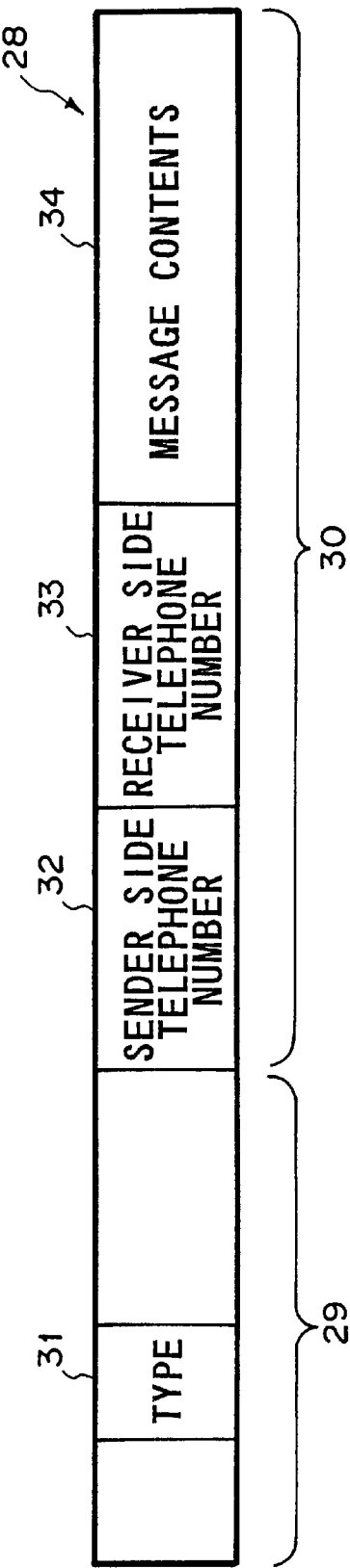

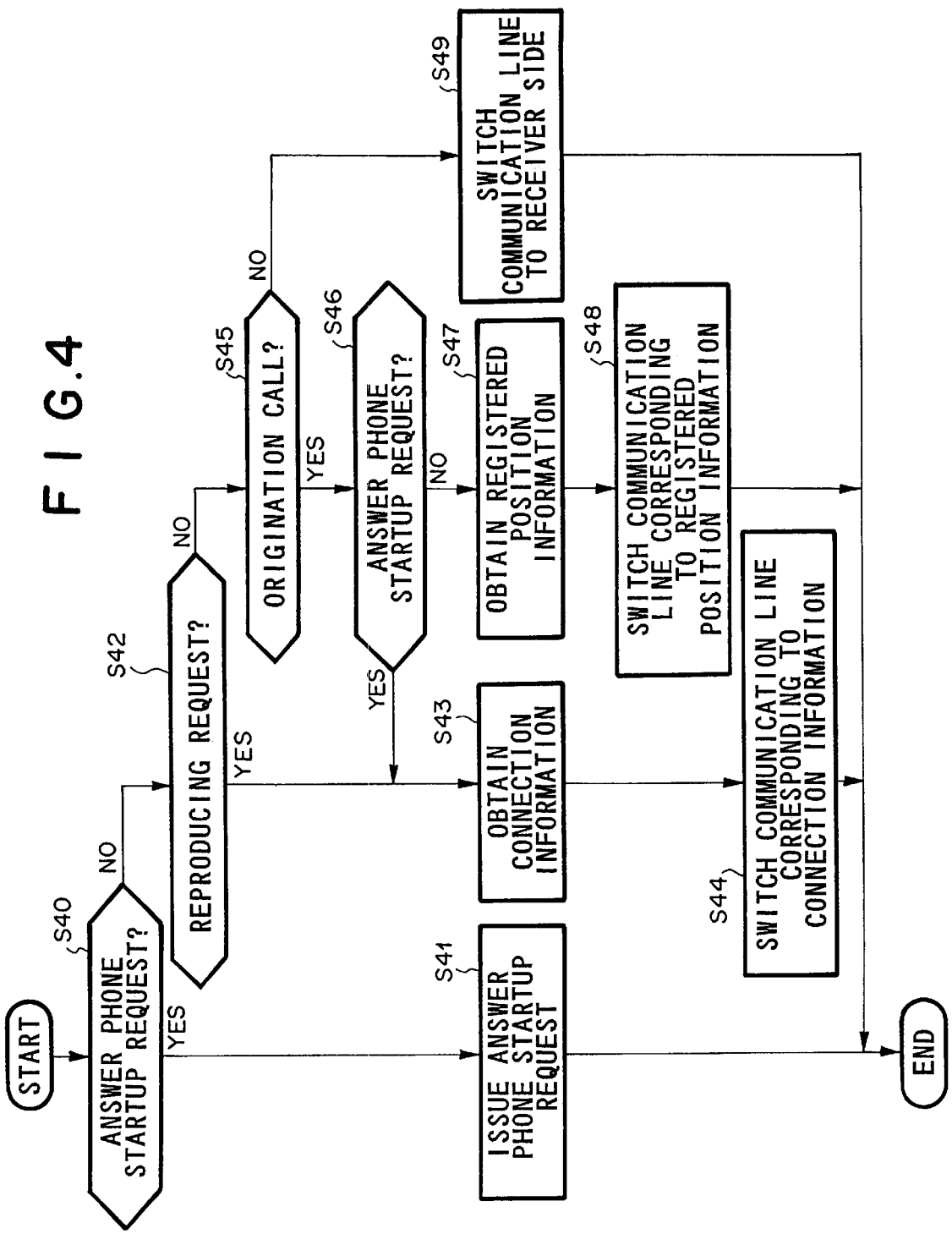

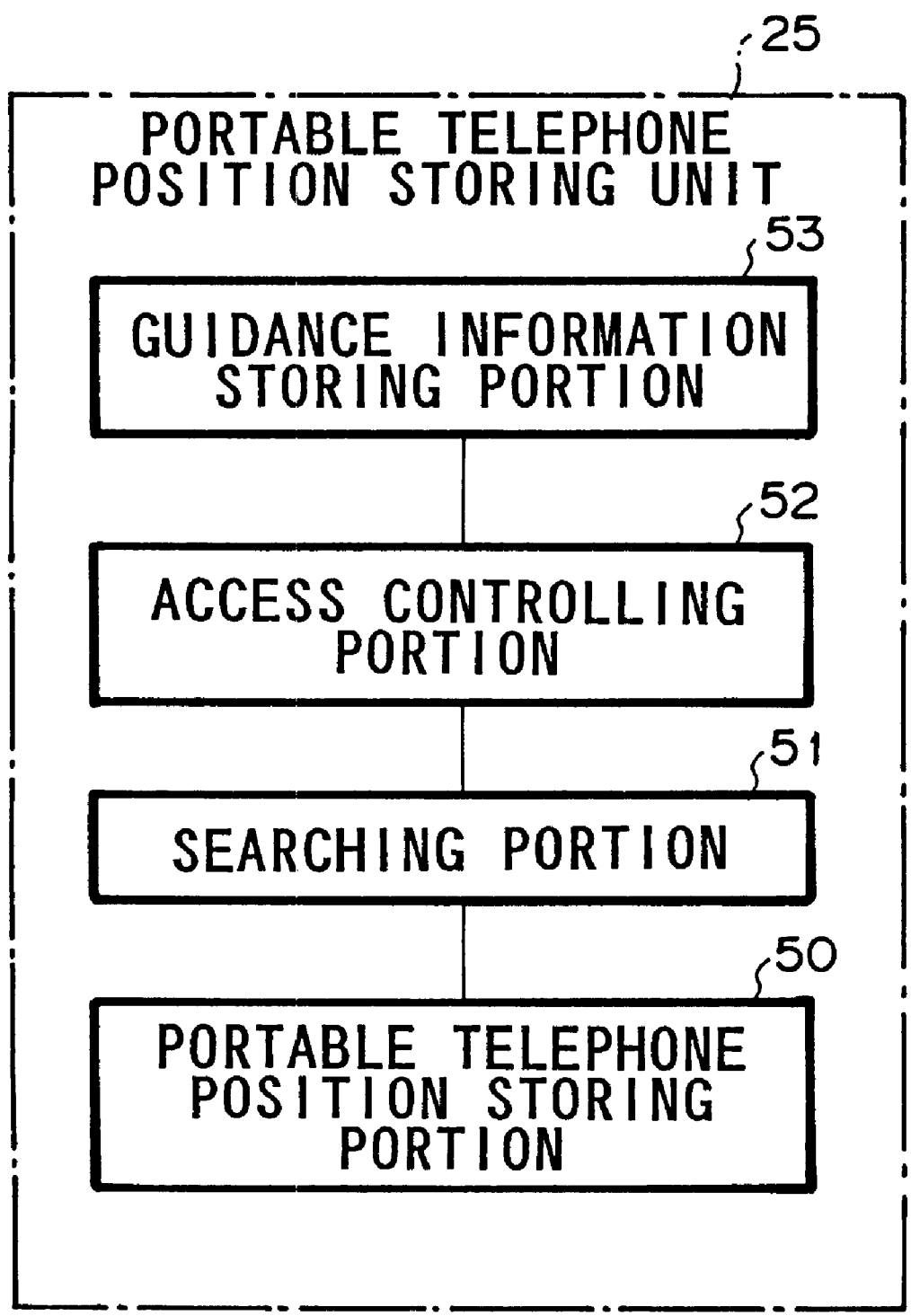

F I G. 7

| TELEPHONE NUMBER OF PORTABLE TELEPHONE UNIT 56 | REGISTERED POSITION INFORMATION 57 | ANSWER PHONE STARTUP INFORMATION 58 | INTERNET TELEPHONE TRANSFERRING UNIT CONNECTION INFORMATION 59 |
|---|---|---|---|
| TELEPHONE NUMBER OF PORTABLE TELEPHONE UNIT | REGISTERED POSITION INFORMATION | ANSWER PHONE STARTUP INFORMATION | INTERNET TELEPHONE TRANSFERRING UNIT CONNECTION INFORMATION |
| ... | ... | ... | ... |
| TELEPHONE NUMBER OF PORTABLE TELEPHONE UNIT | REGISTERED POSITION INFORMATION | ANSWER PHONE STARTUP INFORMATION | INTERNET TELEPHONE TRANSFERRING UNIT CONNECTION INFORMATION |

55

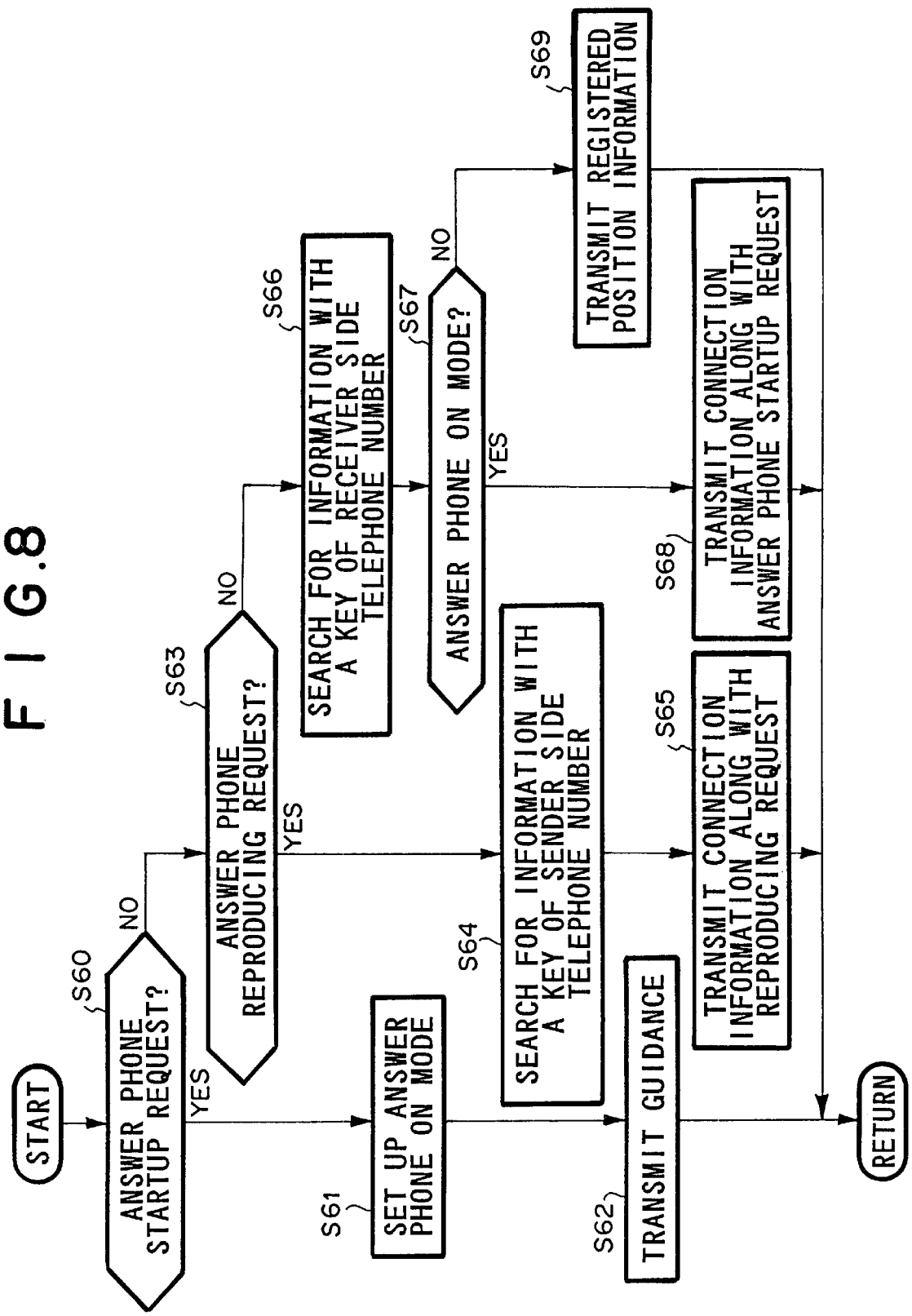

F I G. 9
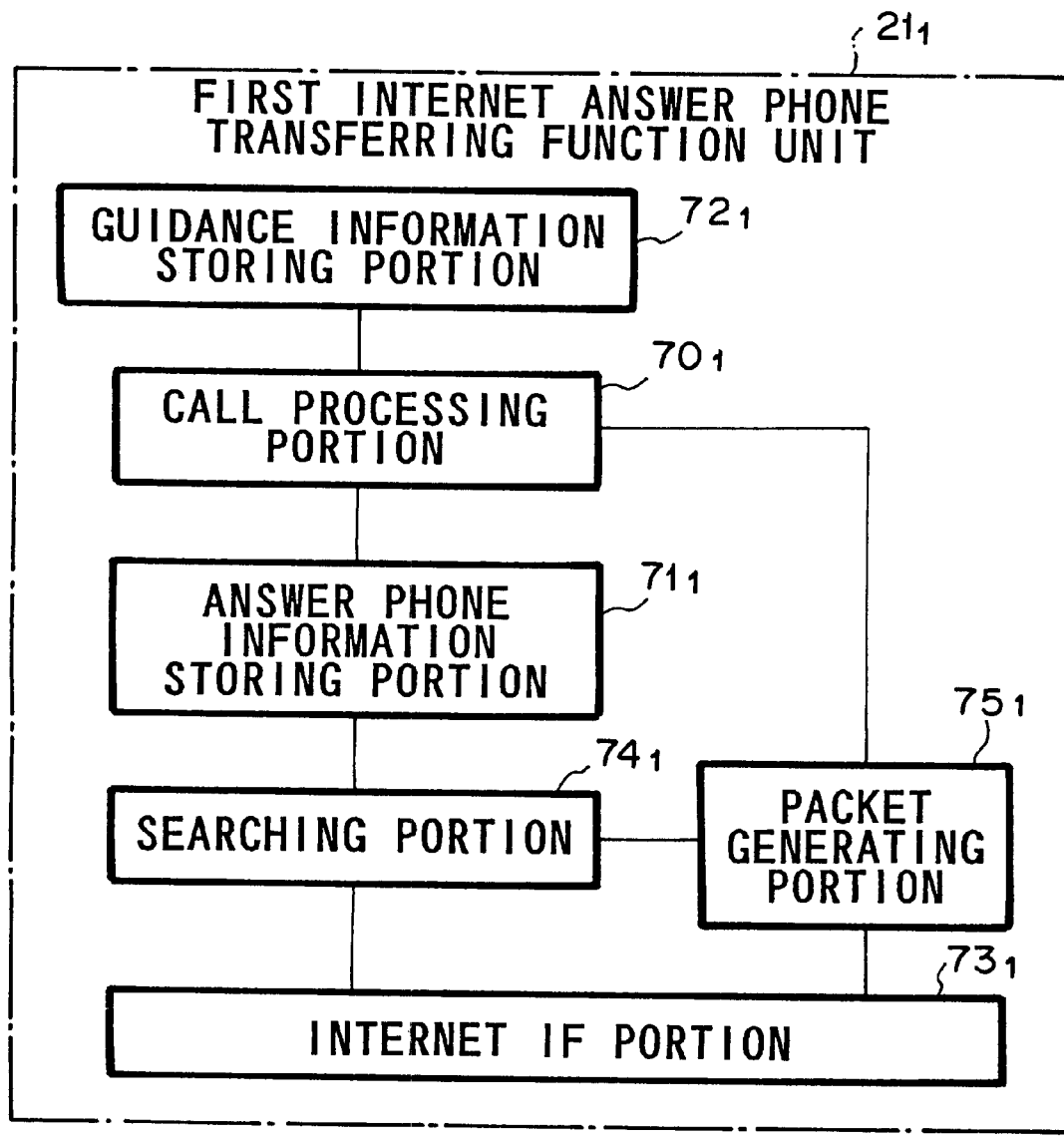

FIG. 10

| SENDER SIDE TELEPHONE NUMBER | RECEIVER SIDE TELEPHONE NUMBER | ANSWER PHONE ANSWER PHONE INFORMATION | ADDITIONAL INFORMATION |
|---|---|---|---|
| SENDER SIDE TELEPHONE NUMBER | RECEIVER SIDE TELEPHONE NUMBER | ANSWER PHONE ANSWER PHONE INFORMATION | ADDITIONAL INFORMATION |
| ... | ... | ... | ... |
| SENDER SIDE TELEPHONE NUMBER | RECEIVER SIDE TELEPHONE NUMBER | ANSWER PHONE ANSWER PHONE INFORMATION | ADDITIONAL INFORMATION |

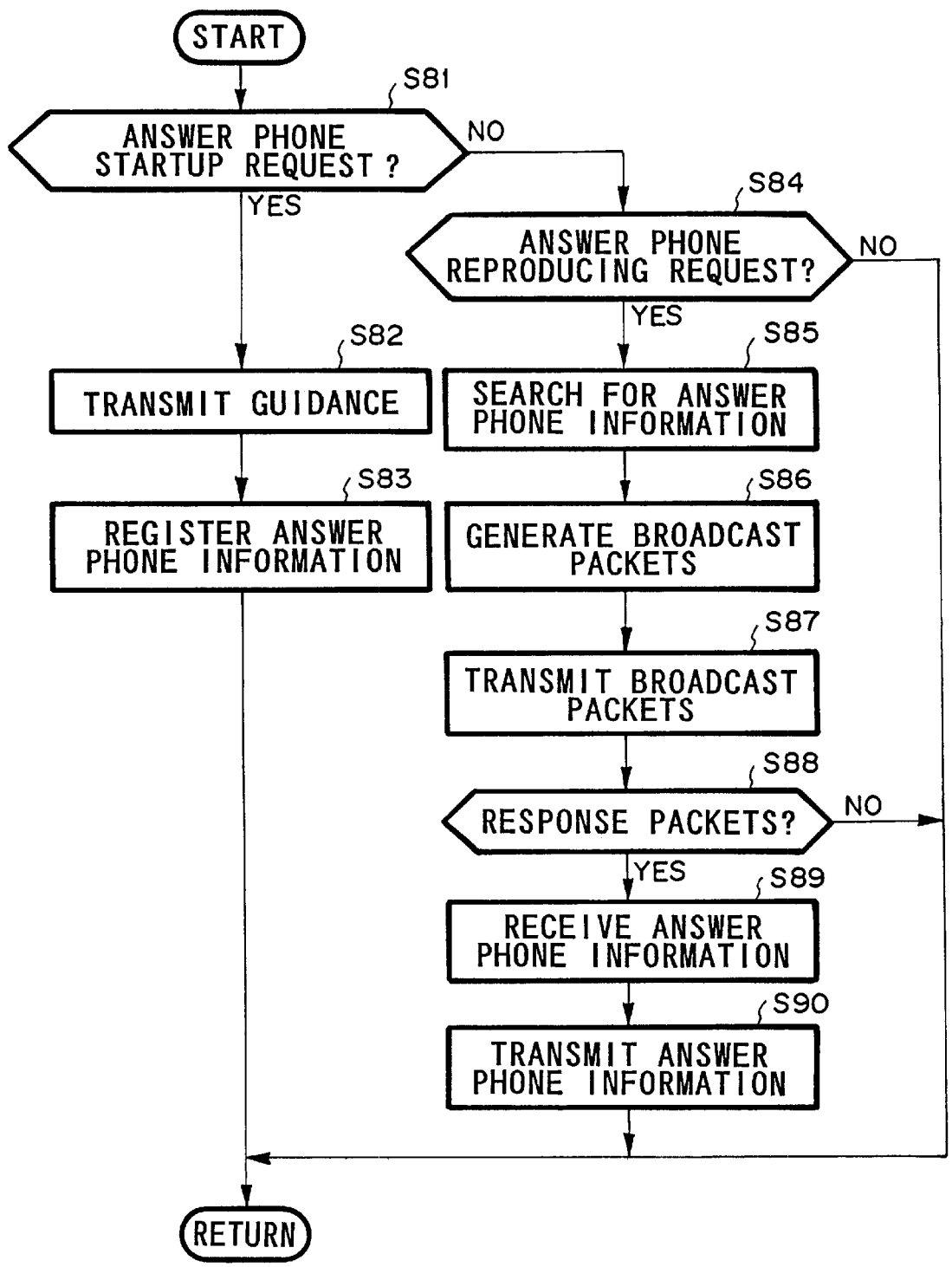

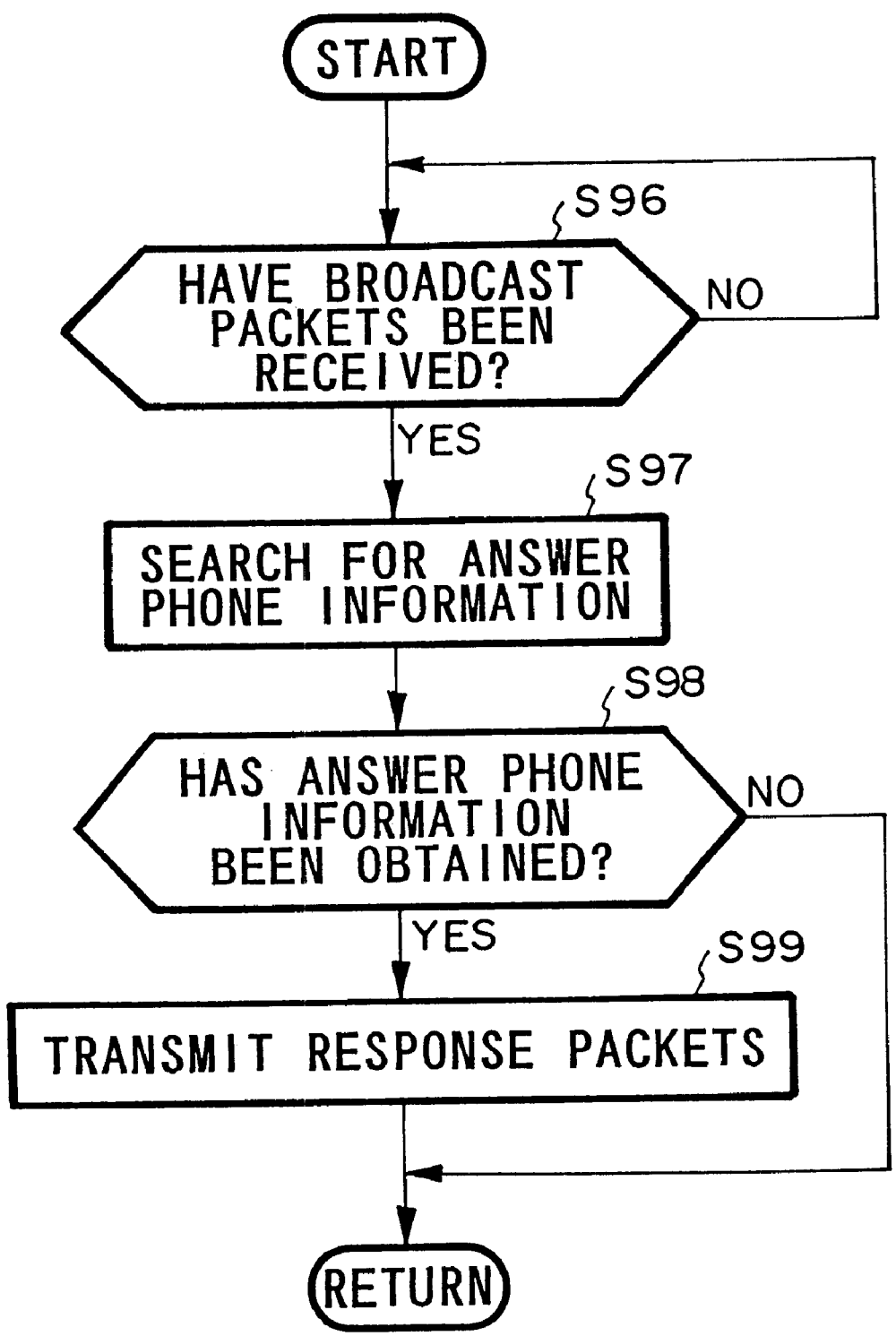

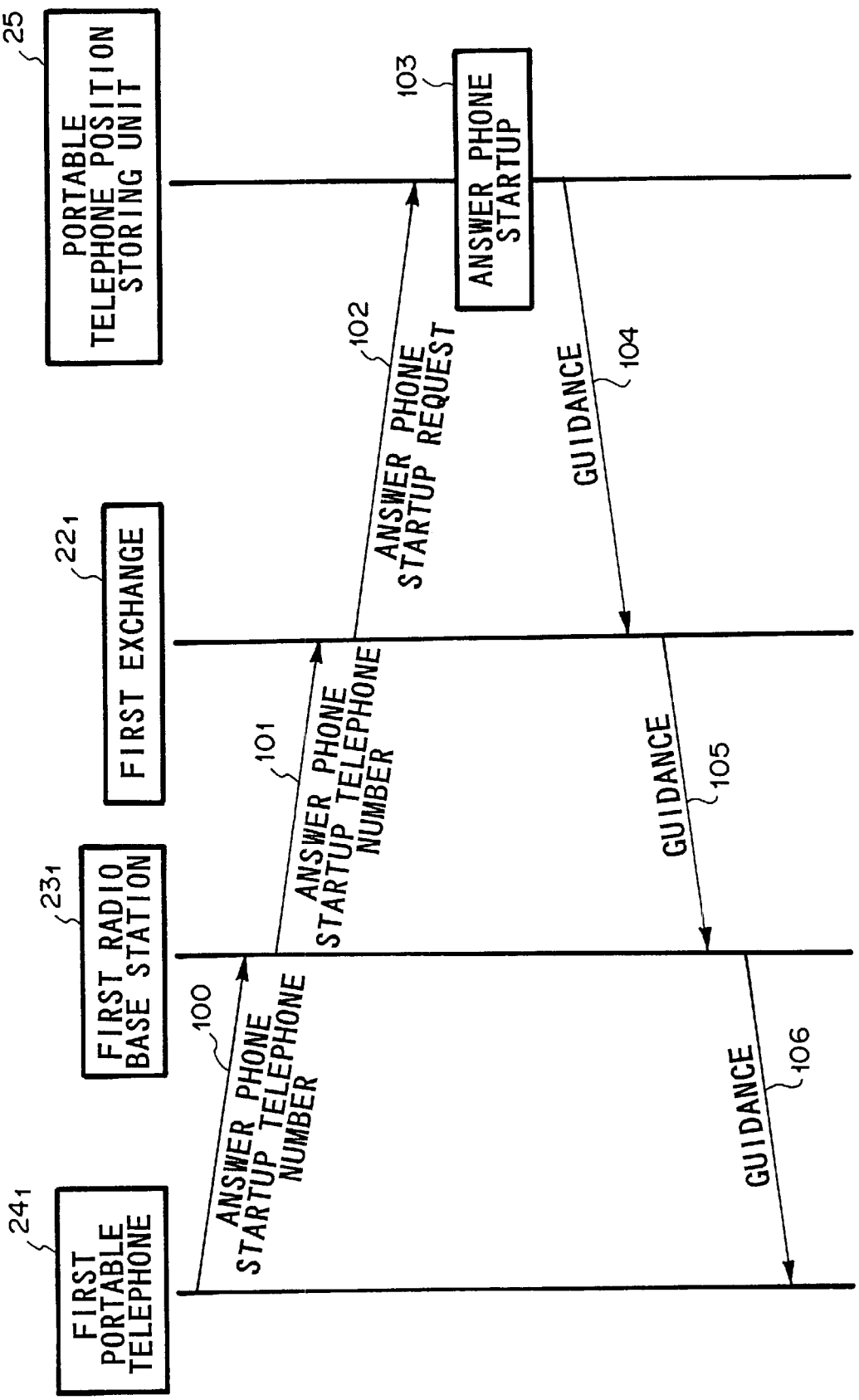

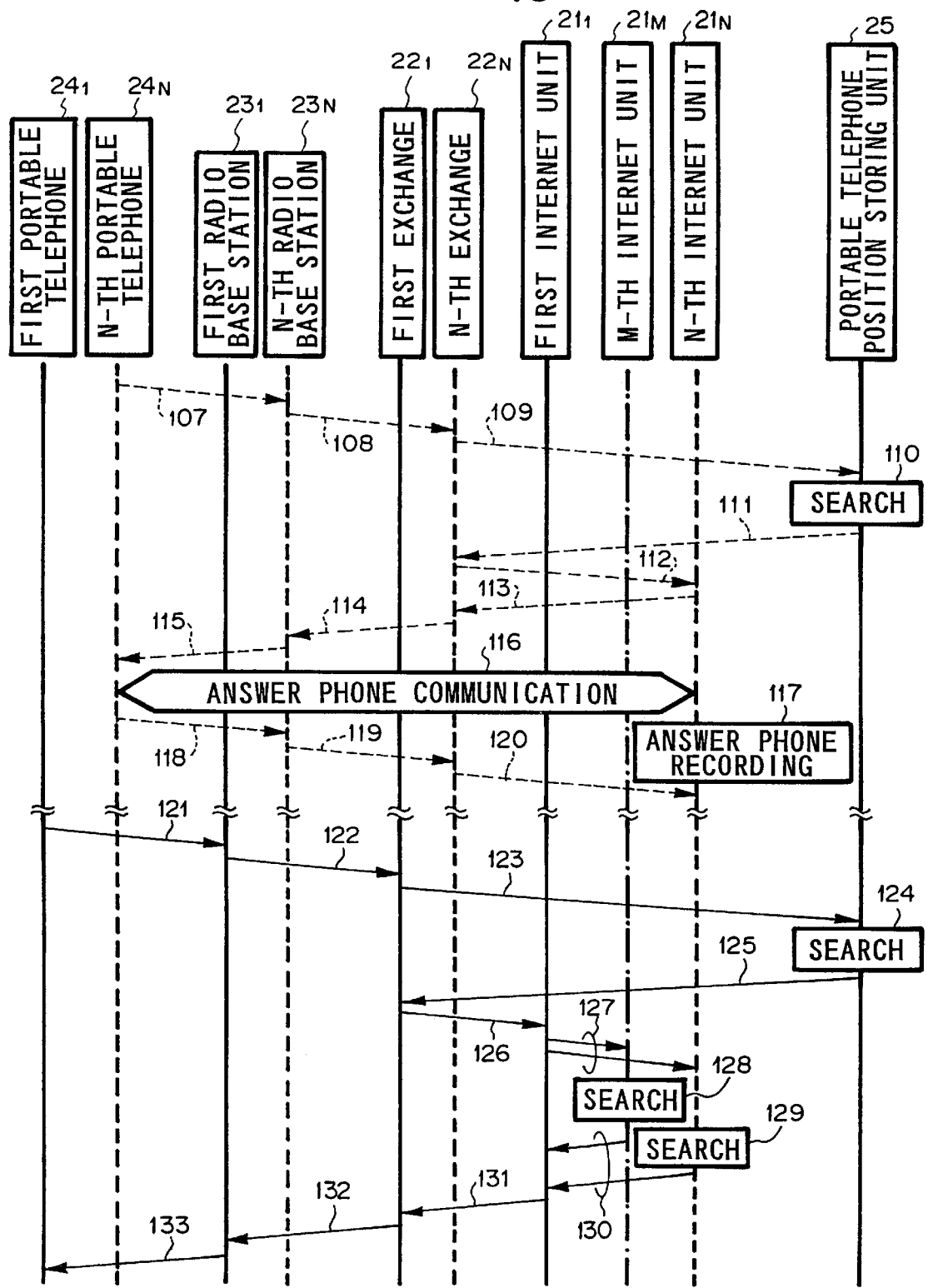

SYSTEM AND METHOD FOR TRANSFERRING A MESSAGE RESPONDING TO AN ANSWER PHONE THROUGH A PACKET NETWORK

BACKGROUND OF THE INVENTION

1. Field of the Invention

The present invention relates to an answer phone system, in particular, to an answer phone system having an answer phone function disposed on an exchange side.

2. Description of the Related Art

Conventionally, telephone units that are subscriber terminal units used in homes and offices have an answer phone function. With the answer phone function, if a receiving party is absent, a voice message of a sending party is recorded and reproduced with a speech circuit. Since the cost of a semiconductor memory used to record a voice message is lowering and the storage capacity thereof is rising, such an answer phone function can be used with only a telephone unit as a terminal unit.

On the contrary, an answer phone system having an answer phone function disposed on the exchange side is known. Since a terminal unit has the above answer phone function, the answer phone system disposed on the exchanger is limited to emergency calls for special situations.

However, in recent years, the number of users of mobile terminal units such as portable telephone units that communicate using a mobile communication network has remarkably increased. Due to the characteristics of the mobile telephone units, the users frequently use the answer phone function. Although the mobile telephone network covers most urban areas, their uses are restricted from view points of safety and etiquette (in car and public transportation). In such situations, the users should use the answer phone system. In addition, since there are needs for reducing the size and weight of the mobile terminal units such as portable telephone units, it is necessary to omit an additional device that stores an answer phone voice message.

For that reason, the answer phone service of the mobile communication network for portable telephone units or the like is provided on the exchange side, not the terminal unit side. Thus, both the needs for reducing the size of the terminal unit and for preventing the service from deteriorating due to an increase of the uses of the service are satisfied.

FIG. 1 shows an outlined structure of a conventional answer phone system. The answer phone system has an answer phone function of a mobile telephone network for portable telephone units. The answer phone system is composed of a public telephone network, first to N-th exchanges $11_1$ to $11_N$ (where 1<M<N; M and N are natural numbers), an answer phone unit 12, and a portable telephone position storing unit 13. The public telephone network 10 has a plurality of exchanges (not shown) that connect and switch lines of the network. The first to N-th exchanges $11_1$ to $11_N$ accommodate first to N-th radio base stations $14_1$ to $14_N$, respectively. The radio base stations $14_1$ to $14_N$ recognize first to N-th portable telephone units $15_1$ to $15_N$, respectively. The answer phone unit 12 totally manages voice messages for the answer phone functions of the first to N-th portable telephone units $15_1$ to $15_N$. The portable telephone position storing unit 14 stores registered-position information that represents which registered portable telephone unit is positioned in the radio area of which radio base station. The registered-position information is frequently updated corresponding to a predetermined position registering process.

In the answer phone system, the user of each portable telephone unit sets up an answer phone on/off mode. When the user of the first portable telephone unit $15_1$ has set up an answer phone off mode, a call from the N-th portable telephone unit $15_N$ to the first portable telephone unit $15_1$ is connected to the portable telephone position storing unit 13 through the N-th radio base station $14_N$, the N-th exchange $11_N$, and the public telephone network 10. As explained above, the portable telephone position storing unit 13 has registered the radio base station that manages the radio area of the pre-registered portable telephone unit. The portable telephone position storing unit 13 transmits the registered-position information that represents the first exchange $11_1$ or the first radio base station $14_1$ that accommodates the first portable telephone unit $15_1$ as the receiving party to the N-th exchange $11_N$ through the public telephone network 10 corresponding to the call from the N-th portable telephone unit $15_N$. With reference to the registered-position information, the N-th exchange $11_N$ connects the call to the first exchange $11_1$ that accommodates the first radio base station $14_1$ through the public telephone network 10 so as to establish a communication path. Thus, the N-th portable telephone unit $15_N$ can communicate with the first portable telephone unit $15_1$.

When the user of the first portable telephone unit $15_1$ has set up the answer phone on mode, a call from the N-th portable telephone unit $15_N$ to the first portable telephone unit $15_1$ is connected to the portable telephone position storing unit 13 through the N-th radio base station $14_N$, the N-th exchange $11_N$, and the public telephone network 10. The portable telephone position storing unit 13 has already registered the answer phone on mode of the first portable telephone unit $15_1$. Corresponding to the call from the N-th portable telephone unit $15_N$, the portable telephone position storing unit 13 notifies the N-th exchange $11_N$ that the first exchange $11_1$ has been set up to the answer phone on mode through the public telephone network 10. Thus, the N-th exchange $11_N$ is connected to the answer phone unit 12 through the public telephone network 10 so as to establish a communication path. Consequently, a voice message that has been input from the N-th portable telephone unit $15_N$ is recorded and stored to the answer phone unit 12 so that the voice message can be reproduced by the first portable telephone unit $15_1$.

In the case that the first portable telephone unit $15_1$ has set up the answer phone on mode and the answer phone unit 12 has registered answer-phone information (voice message), when the user of the first portable telephone unit $15_1$ reproduces the voice message registered in the answer phone unit 12, the user dials a pre-assigned telephone number with the first portable telephone unit $15_1$ so as to issue an answer-phone-reproducing request to the answer phone unit 12. The answer-phone-reproducing request is transmitted to the portable telephone position storing unit 13 through the first radio base station $14_1$, the first exchange $11_1$, and the public telephone network 10 (transmission 16). The portable telephone position storing unit 13 stores registration-valid/invalid information of answer-phone information of the answer phone service as well as the registered-position information. The portable telephone unit position storing unit 13 notifies the first exchange $11_1$ that answer-phone information has been registered (notification 1). When the first exchange $11_1$ has received the notification 1, the first exchange $11_1$ connects a communication path with the answer phone unit 12 that has totally registered answer-phone information (connection 18). The first exchange $11_1$ transmits the voice information reproduced corresponding to the answer-phone information registered in the answer phone unit 12 to the first portable telephone unit $15_1$ through the first radio base station $14_1$ (transmission 19).

In such an answer phone system, since the user records and reproduces answer-phone information as a voice message through the public telephone network, he or she may be charged for a communication fee corresponding to the distance from the answer phone unit 12 and the user's terminal unit. In particular, when the user uses the answer phone service through an international telephone line network, the user may be charged for an expensive fee. To solve this problem, a technology disclosed in Japanese Utility Model Registration No. 3052588 titled "Apparatus for Transmitting Voice Information" is known. In the technology, a telephone unit is used as an Internet terminal unit. Answer-phone information is obtained from a voice mail storing unit through a mail server of the Internet.

In the conventional answer phone system shown in FIG. 1, the user who wants to use the answer phone service must dial a predetermined telephone number to retrieve the registered voice message, which is a inconvenience for the user. Even in a restricted situation in a public transportation such as a train, the user tends to use his or her portable telephone unit to avoid the above inconvenience, which is not desirable from a view point of etiquette.

On the other hand, in the case that the use of a portable telephone unit is restricted in a public transportation, when the user turns off his or her portable telephone unit, he or she should use the answer phone service afterward. Whenever the user uses the answer phone service for a registered voice message, the user is charged for a communication fee. As a result, the user moreover tends to use the portable telephone unit even if the use is restricted (in a public transportation such as a train).

When the position of the portable telephone terminal is far from the answer phone unit, the user must pay a regular communication fee even for a one-way communication. Thus, even if a particular communication provider leases a line from another communication provider, the former must pay an unexpected transfer communication fee. Such an unreasonable situation should be solved.

A registered voice message is transferred from the answer phone unit to a terminal unit. When the transmission amount of information needed for an answer-phone-reproducing request is compared with the transmission amount of information needed for reproduced-voice information, the latter is extremely large. Therefore, the information transmission efficiency is low. This disadvantage will adversely affect the quality of the answer phone service in a situation of a drastic increase of the number of portable telephone subscribers.

In the technology disclosed in Japanese Utility Model Registration No. 3052588, although an answer phone service can be provided between particular subscriber telephone units, in addition to a rise of the system cost, it is impossible to substitute all conventional subscriber telephone units with Internet terminal units.

SUMMARY OF THE INVENTION

Therefore, an object of the present invention is to provide an answer phone system in which an answer phone service is accomplished at a low user cost and the information thereof is effectively transmitted.

According to a first aspect of the present invention, there is provided a system for transferring a message responding to an answer phone through a packet network, comprising: a first telephone unit for transmitting the message; a first exchange for receiving the message transmitted from the first telephone unit to transfer the message; a first answer phone-transferring function unit for receiving the message transferred from the first exchange to store the message; a second answer phone-transferring function unit for retrieving the message from the first answer phone-transferring function unit through the packet network to transmit the message; a second exchange for receiving the message transmitted from the second answer phone-transferring function unit to transfer the message; and a second telephone unit for receiving the message transferred from the second exchange.

The system for transferring a message responding to an answer phone through a packet network may further comprise third answer phone transferring function units; wherein the second answer phone transferring function unit broadcasts a request packet to the first answer phone transferring function unit and the third answer phone transferring function units to retrieve the message from the first answer phone-transferring function unit.

In the system for transferring a message responding to an answer phone through a packet network, if one or more of the third answer phone transferring function units have stored messages, the second answer phone transferring function unit retrieves the messages from the third answer phone transferring function units which have stored messages so that the second answer phone transferring function unit transmits all the messages retrieved.

The system for transferring a message responding to an answer phone through a packet network may further comprise a storing unit; wherein if the second exchange receives an answer-phone-startup request from the second telephone unit, the second exchange transfers the answer-phone-startup request to the storing unit; and wherein if the storing unit receives the answer-phone-startup request from the second telephone unit through the second exchange, the storing unit turns on an answer-phone-startup information for the second telephone unit.

In the system for transferring a message responding to an answer phone through a packet network, if the first exchange receives a call originated from the first telephone unit and designated to the second telephone unit, the first exchange inquires of the storing unit whether or not the answer-phone-startup information is turned on for the second telephone unit; and if the answer-phone-startup information is turned on for the second telephone unit, the first exchange establishes a connection for the transmission of the message from the first telephone unit to the first answer phone-transferring function unit.

In the system for transferring a message responding to an answer phone through a packet network, if the second exchange received an answer-phone-reproducing request from the second telephone unit, the second exchange establishes a connection for the transmission of the message from the second answer phone-transferring function unit to the second telephone unit.

The system for transferring a message responding to an answer phone through a packet network may further comprise a storing unit for storing a connection information of the first answer phone-transferring function unit and a connection information of the second answer phone-transferring function unit; wherein the first exchange obtains the connection information of the first answer phone-transferring function unit from the storing unit; and wherein the second exchange obtains the connection information of the second answer phone-transferring function unit from the storing unit.

According to a second aspect of the present invention, there is provided a method for transferring a message responding to an answer phone through a packet network, comprising: a step that a first telephone unit transmits the message; a step that a first exchange receives the message from the first telephone unit; a step that the first exchange transfers the message; a step that a first answer phone-transferring function unit receives the message from the first exchange; a step that the first answer phone-transferring function unit stores the message; a step that a second answer phone-transferring function unit retrieves the message from the first answer phone-transferring function unit through the packet network; a step that the second answer phone-transferring function unit transmits the message; a step that a second exchange receives the message from the second answer phone-transferring function unit; a step that the second exchange transfers the message from the second answer phone-transferring function unit; and a step that a second telephone unit receives the message transferred from the second exchange.

The method for transferring a message responding to an answer phone through a packet network may further comprise: a step that the second answer phone transferring function unit broadcasts a request packet to the first answer phone transferring function unit and third answer phone transferring function units to retrieve the message from the first answer phone-transferring function unit.

The method for transferring a message responding to an answer phone through a packet network may further comprise a step that if one or more of the third answer phone transferring function units have stored messages, the second answer phone transferring function unit retrieves the messages from the third answer phone transferring function units which have stored messages so that the second answer phone transferring function unit transmits all the messages retrieved.

The method for transferring a message responding to an answer phone through a packet network may further comprise: a step that if the second exchange receives an answer-phone-startup request from the second telephone unit, the second exchange transfers the answer-phone-startup request to a storing unit; and a step that if the storing unit receives the answer-phone-startup request from the second telephone unit through the second exchange, the storing unit turns on an answer-phone-startup information for the second telephone unit.

The method for transferring a message responding to an answer phone through a packet network may further comprise: a step that if the first exchange receives a call originated from the first telephone unit and designated to the second telephone unit, the first exchange inquires of the storing unit whether or not the answer-phone-startup information is turned on for the second telephone unit; and a step that if the answer-phone-startup information is turned on for the second telephone unit, the first exchange establishes a connection for the transmission of the message from the first telephone unit to the first answer phone-transferring function unit.

The method for transferring a message responding to an answer phone through a packet network may further comprise: a step that if the second exchange received an answer-phone-reproducing request from the second telephone unit, the second exchange establishes a connection for the transmission of the message from the second answer phone-transferring function unit to the second telephone unit.

The method for transferring a message responding to an answer phone through a packet network may further comprise: a step that a storing unit stores a connection information of the first answer phone-transferring function unit and a connection information of the second answer phone-transferring function unit; a step that the first exchange obtains the connection information of the first answer phone-transferring function unit from the storing unit; and a step that the second exchange obtains the connection information of the second answer phone-transferring function unit from the storing unit.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 2 is a schematic diagram showing an outlined structure of an answer phone system according to an embodiment of the present invention;

FIG. 3 is a schematic diagram for explaining an outlined structure of a principal portion of a first exchange according to the embodiment of the present invention;

FIG. 4 is a flow chart showing an outline of a controlling process of a controlling program of the first exchange according to the embodiment of the present invention;

FIG. 5 is a schematic diagram for explaining an example of the format of a signal transmitted through a public telephone network according to the embodiment of the present invention;

FIG. 6 is a schematic diagram for explaining an outlined structure of a principal portion of a portable telephone position storing unit according to the embodiment of the present invention;

FIG. 7 is a schematic diagram for explaining an outline of registered information stored in the portable telephone position storing portion according to the embodiment of the present invention;

FIG. 8 is a flow chart showing an outline of a controlling process of a controlling program of the portable telephone position storing unit according to the embodiment of the present invention;

FIG. 9 is a schematic diagram for explaining an outline of a principal portion of a first Internet answer phone-transferring function unit according to the embodiment of the present invention;

FIG. 10 is a schematic diagram for explaining an outline of answer-phone information stored in an answer-phone information storing portion according to the embodiment of the present invention;

FIG. 11 is a flow chart showing an outline of a controlling process of a controlling program corresponding to individual requests of the first Internet answer phone-transferring function unit according to the embodiment of the present invention;

FIG. 13 is a flow chart showing an outline of a controlling process of a controlling program in the case that a response packet is received by the first Internet answer phone-transferring function unit according to the embodiment of the present invention;

FIG. 14 is a sequence diagram showing a flow of an answer phone startup operation of the answer phone system according to the embodiment of the present invention; and FIG. 15 is a sequence diagram showing a flow of the operation in the case that a voice message is recorded and an answer-phone-reproducing request is issued in the answer phone system according to the embodiment of the present invention.

DESCRIPTION OF PREFERRED EMBODIMENT

Figure 1:
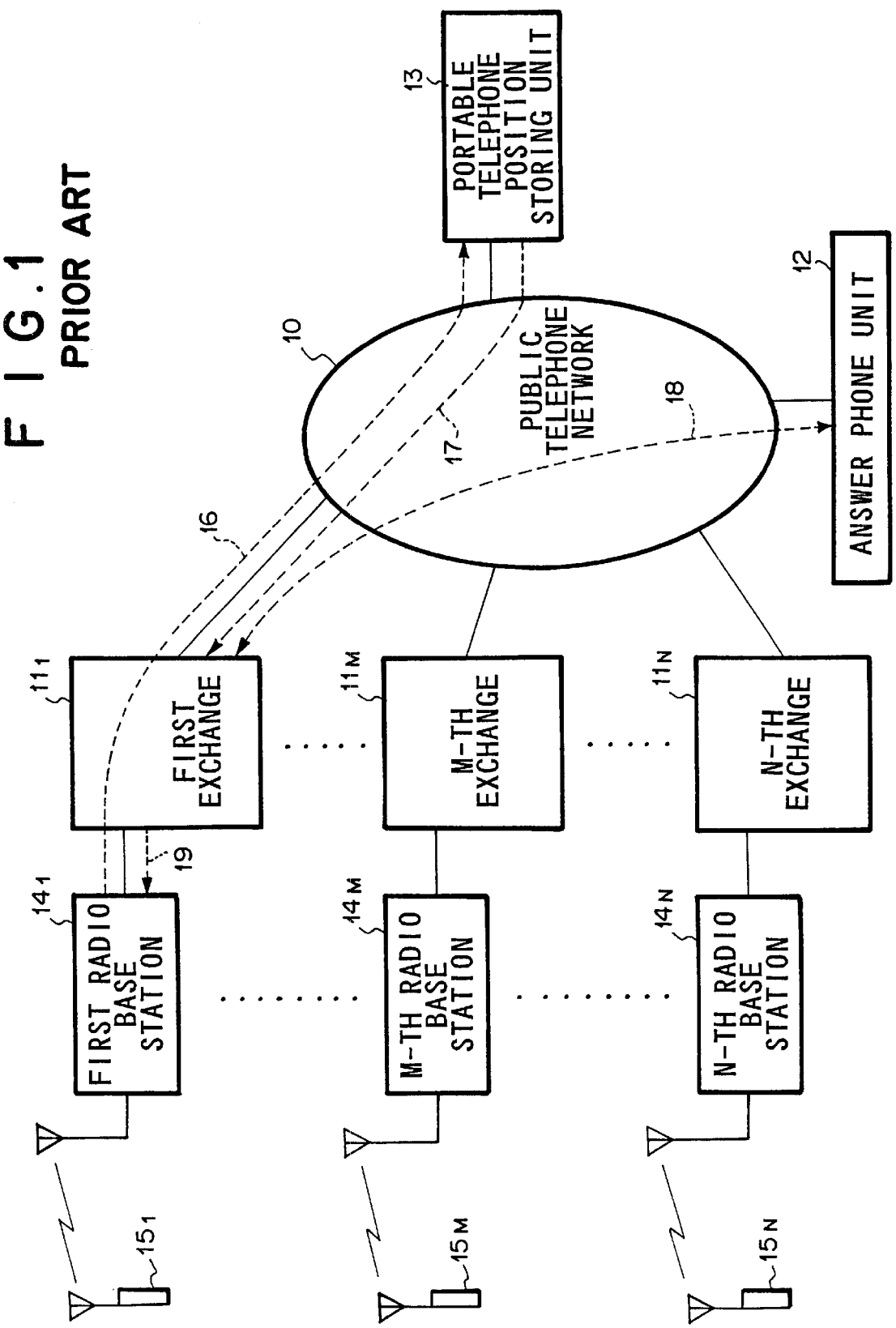
FIG. 1 is a schematic diagram showing an outlined structure of a conventional answer phone system.

Next, with reference to the accompanying drawings, an embodiment of the present invention will be explained.

FIG. 2 is a schematic diagram showing an outlined structure of an answer phone system according to an embodiment of the present invention. The answer phone system according to the embodiment has an answer phone function for a mobile communication network using for example portable telephone units. The answer phone system accommodates first to N-th Internet answer phone-transferring function units $21_1$ to $21_N$ connected to the Internet 20. The first to N-th Internet answer phone-transferring function units $21_1$ to $21_N$ are connected to first to N-th exchanges $22_1$ to $22_N$, respectively. The first to N-th exchanges $22_1$ to $22_N$ accommodate first to N-th radio base stations $23_1$ to $23_N$, respectively. The radio base stations $23_1$ to $23_N$ recognize first to N-th portable telephone units $24_1$ to $24_N$ positioned in respective radio areas, respectively. The first to N-th exchanges $22_1$ to $22_N$ are connected to a portable telephone position storing unit 25 through a public telephone network (not shown).

A plurality of data networks are connected to the Internet 20 through which packet data complying with the TCP/IP (Transmission Control Protocol/Internet Protocol) is transmitted. The first to N-th Internet answer phone-transferring function units $21_1$ to $21_N$ generate packet data complying with the TCP/IP transmitted through the Internet 20 and perform transmitting/receiving processes for the packet data. Finally, the first to N-th Internet answer phone-transferring function units $21_1$ to $21_N$ store answer-phone information that is voice messages recorded by the portable telephone units managed by the first to N-th exchanges $22_1$ to $22_N$.

The first to N-th exchanges $22_1$ to $22_N$ switch communication paths among the respective radio base stations $23_1$ to $23_N$, the respective Internet answer phone-transferring function units $21_1$ to $21_N$, and the portable telephone position storing unit 25. The first to N-th radio base stations $23_1$ to $23_N$ transmit and receive information as radio waves to/from portable telephone units $24_1$ to $24_N$ positioned in respective service areas. The portable telephone position storing unit 25 stores registered-position information that represents which portable telephone unit that has been registered is positioned in which radio base station area. The registered-position information is frequently updated corresponding to a predetermined position registering process. In addition, the portable telephone position storing unit 25 stores answer-phone-startup information and connection information for each portable telephone unit. The answer-phone-startup information represents the answer phone on/off modes. The connection information will be explained later.

In the answer phone system according to the embodiment, after the user of a portable telephone unit has set up the answer phone on mode with a predetermined operation, when a call to the portable telephone unit takes place, a voice message is stored to an Internet answer phone-transferring function unit adjacent to the sender side portable telephone unit. Since the Internet answer phone-transferring function unit stores the voice message, it is avoided that the user of the sender side portable telephone unit is charged for an expensive communication fee for a long distance from the sender side portable telephone unit to the conventional remote answer phone unit through the public telephone network. Likewise, when the user of the receiver side portable telephone unit who has set up the answer phone on mode wishes to obtain a voice message, the receiver side portable telephone unit causes an Internet answer phone-transferring function unit adjacent thereto to inquire if other Internet answer phone-transferring function units have stored a voice message addressed to the receiver side portable telephone unit through the Internet using a broadcasting mode. The receiver side portable telephone unit obtains the self-addressed voice message from the Internet answer phone-transferring function unit adjacent thereto. Thus, it is avoided that the user is charged for an expensive communication fee corresponding to the distance from his or her portable telephone unit to the conventional answer phone unit through the public telephone network.

Next, the answer phone system according to the embodiment of the present invention will be explained in detail. Each of the first to N-th portable telephone units $24_1$ to $24_N$ has a call processing portion, a voice message inputting/outputting portion, and a telephone number inputting portion. The call processing portion processes a call as a radio wave received or transmitted from or to a radio base station. With the voice message inputting/outputting portion, the user of the sender side portable telephone unit communicates with the user of the receiver side portable telephone unit using a voice. Each portable telephone unit has been assigned a unique telephone number.

In the answer phone system according to the embodiment of the present invention, each user can use various functions of the answer phone service with predetermined telephone numbers assigned thereto. The portable telephone units are positioned in individual radio areas of the first to N-th radio base stations $23_1$ to $23_N$. The portable telephone units transmit and receive radio waves to and from respective radio base stations. The first to N-th radio base stations $23_1$ to $23_N$ are accommodated in the first to N-th exchanges $22_1$ to $22_N$, respectively.

FIG. 3 shows an outlined structure of a principal portion of the first exchange $22_1$. The structure of the first exchange $22_1$ is the same as that of each of the second to N-th exchanges $22_2$ to $22_N$. The first exchange $22_1$ has a call controlling portion $26_1$ and a switching portion $27_1$. The call controlling portion $26_1$ processes a call received and transmitted from and to each portable telephone unit accommodated therein. The switching portion $27_1$ switches and connects a line corresponding to the call process performed by the call controlling portion $26_1$. The exchange $22_1$ inputs and outputs various signals for various functions of the answer phone service as well as calls from portable telephone units accommodated in the radio base station and calls terminated to the portable telephone units. The call controlling portion $26_1$ of the first exchange $22_1$ has a central processing unit (CPU) (not shown). The call controlling portion $26_1$ can execute various controlling operations corresponding to a controlling program stored in a predetermined recordable medium such as a read-only memory (ROM).

FIG. 4 shows an outline of a controlling process of the call controlling portion $26_1$ of the first exchange $22_1$. The call controlling portion $26_1$ determines the type of each signal (having a predetermined format) received from the first Internet answer phone-transferring function unit $21_1$, the first radio base station $23_1$, and the portable telephone position storing unit 25 connected to the first exchange $22_1$. In other words, the call controlling portion $26_1$ determines whether the received signal is an answer phone startup request, an answer-phone-recording request, an answer phone reproducing request, an origination call, or a termination call.

FIG. 5 shows an example of the format of each signal. A signal 28 has a header field 29 and a data field 30. The header field 29 has a signal identification field 31 that represents a protocol identifier and a signal type. The header field 29 is used for controlling the transmitting operation and the receiving operation of a signal to be transmitted. The data field 30 has a sender side telephone number 32, a receiver side telephone number 33, and a message contents 34 (that is data itself to be transmitted). The data field 30 varies corresponding to a signal identified in the signal type field 31. Such a signal is transmitted or received directly. Alternatively, after such a signal is multiplexed or packetized, it is transmitted or received.

Returning to FIG. 4, the controlling process of the call controlling portion $26_1$ will be explained. With reference to the signal type field 31 of the signal format shown in FIG. 4, the call controlling portion $26_1$ determines the signal type. In other words, when the call controlling portion $26_1$ has received a predetermined telephone number designated as the answer-phone-startup request (namely, the determined result at step S40 is Yes), the call controlling portion $26_1$ transmits an answer phone start request in the signal format shown in FIG. 5 to the portable telephone position storing unit 25 (at step S41). The answer-phone-startup request causes the portable telephone position storing unit 25 to set up the first portable telephone unit $24_1$ to the answer phone on mode.

When the call controlling portion $26_1$ has received a predetermined telephone number designated as the answer phone reproducing mode for reproducing answer-phone information from a portable telephone unit (namely, the determined result at step S40 is No and the determined result at step S42 is Yes), the call controlling portion $26_1$ transmits a signal including the sender side telephone number of the first portable telephone unit $24_1$ in the format shown in FIG. 5 to the portable telephone position storing unit 25 so as to inquire of the portable telephone position storing unit 25 if the answer phone on mode has been set up for the first portable unit telephone $24_1$. When the answer phone on mode has been set up, the call controlling portion $26_1$ obtains connection information to the first Internet answer phone-transferring function unit $21_1$ from the portable telephone position storing unit 25 (at step S43). When the call controlling portion $26_1$ has obtained the connection information, the call controlling portion $26_1$ controls the switching portion $27_1$ corresponding to the connection information and connects a communication path between the first radio base station $23_1$ that manages the first portable telephone unit $24_1$ and the first Internet answer phone-transferring function unit $21_1$ (at step S44). Thereafter, the call controlling portion $26_1$ obtains answer-phone information that is addressed to the first portable telephone unit $24_1$ from the first Internet answer phone-transferring function unit $21_1$.

When the signal is a normal origination call rather than a predetermined reproducing request (namely, the determined result at step S40 is No; the determined result at step S42 is No; and the determined result at step S45 is Yes), the call controlling portion $26_1$ determines whether or not the portable telephone position storing unit 25 has set up the answer phone on mode for the receiver side portable telephone unit. When the answer phone on mode for the receiver side portable telephone unit has been set up, assuming that the answer-phone-recording request has been issued (namely, the determined result at step S46 is Yes), the call controlling portion $26_1$ obtains the connection information to the first Internet answer phone-transferring function unit $21_1$ from the portable telephone position storing unit 25 (at step S43). When the call controlling portion $26_1$ has obtained the connection information, the call controlling portion $26_1$ controls the switching portion $27_1$ corresponding to the connection information and connects a communication path between the first radio base station $23_1$ that manages the first portable telephone unit $24_1$ and the first Internet answer phone-transferring function unit $21_1$ (at step S44). Thereafter, the answer-phone information that has been received from the first portable telephone unit $24_1$ is registered with the first Internet answer phone-transferring function unit $21_1$.

When the call controlling portion $26_1$ has referenced the portable telephone position storing unit 25 and determined that the answer phone on mode for the receiver side portable telephone unit had not been set up (namely, the determined result at step S46 is No), the call controlling portion $26_1$ issues a registered-position-information-searching request to the portable telephone position storing unit 25. Thereafter, the call controlling portion $26_1$ obtains registered-position information that represents a radio base station that manages the receiver side portable telephone unit and an exchange that accommodates the radio base station (at step S47). When the call controlling portion $26_1$ has obtained the registered-position information, the call controlling portion $26_1$ controls the switching portion $27_1$ corresponding to the registered-position information and connects a communication path between the radio base station that manages the receiver side portable telephone unit and the first radio base station $23_1$ that manages the first portable telephone unit $24_1$ (at step S48). Thereafter, the call controlling portion $26_1$ allows the first portable telephone unit 24 and the receiver side portable telephone unit to communicate with each other.

When it is determined that the input signal is a termination call rather than an origination call at step S45 (namely, the determined result at step S40 is No; the determined result at step S42 is No; and the determined result at step S45 is No), the call controlling portion $26_1$ connects a communication path corresponding to the receiver side telephone number (at step S49).

The portable telephone position storing unit 25 that is frequently accessed by the first exchange $22_1$ totally manages management information such as registered-position information and connection information of the first to N-th portable telephone units $24_1$ to $24_N$. Likewise, the portable telephone position storing unit 25 is accessed by the second to N-th exchanges $22_2$ to $22_N$.

FIG. 6 shows an outlined structure of a principal portion of the portable telephone position storing unit 25. The portable telephone position storing unit 25 has a portable telephone position storing portion 50 and a searching portion 51. The portable telephone position storing portion 50 stores the above-mentioned registered-position information, connection information, and so forth. The searching portion 51 searches for registered information from the portable telephone position storing portion 50. In addition, the portable telephone position storing portion 50 has an access controlling portion 52 and a guidance information storing portion 53. The access controlling portion 52 controls an access request and an access result among the first to N-th exchanges $22_1$ to $22_N$ corresponding to the registered information stored in the portable telephone position storing portion 50. The guidance information storing portion 53 stores guidance-voice information that is transmitted to the portable telephone unit when various requests are issued through the first to N-th exchanges $22_1$ to $22_N$.

FIG. 7 shows an outlined structure of registered information stored in the portable telephone position storing portion 50. Registered information 55 is composed of registered-position information 57, answer-phone-startup information 58, and the Internet-answer-phone-transferring-function-unit-connection information 59 for each portable telephone number 56 assigned to each portable telephone. The registered-position information 57 represents the radio base station that manages a radio area of a portable telephone unit and the exchange that accommodates the radio base station. The answer-phone-startup information 58 represents the answer phone on/off modes. The Internet-answer-phone-transferring-function-unit-connection information 59 represents connection information with which an exchange that accommodates a portable telephone unit connects it to an Internet answer phone-transferring function unit adjacent to the portable telephone unit.

The portable telephone position storing unit 25 transmits a guidance stored in the guidance information storing portion 53 to a portable telephone unit that has issued a request when the portable telephone position storing unit 25 receives an answer phone startup request, an answer-phone-recording request, or an answer-phone-reproducing request from one of the first to N-th exchanges $22_1$ to $22_N$. In addition, the searching portion 51 searches for desired registered information from the portable telephone position storing portion 25.

The access controlling portion 52 of the portable telephone position storing unit 25 has a CPU (not shown). The CPU executes various controlling processes corresponding to a program stored in a predetermined recordable medium such as a ROM.

FIG. 8 shows an outline of a controlling process of a controlling program of the access controlling portion 52 of the portable telephone position storing unit 25. The access controlling portion 52 of the portable telephone position storing unit 25 receives various requests from the first to N-th exchanges $22_1$ to $22_N$. These requests may be request signals that have a predetermined format and are transmitted through a dedicated line. Alternatively, these requests may be request signals that have a format shown in FIG. 5 and are transmitted through a public telephone network (not shown). The formats of these request signals are not limited as long as they can be distinguished from one another. In this example, it is assumed that various signals having the format shown in FIG. 5 are transmitted and received between each of the first to N-th exchanges $22_1$ to $22_N$ and the portable telephone position storing unit 25.

With reference to the header field of a received signal, the access controlling portion 52 determines the type of the request received from one of the first to N-th exchanges $22_1$ to $22_N$. In other words, when the request signal received from one of the first to N-th exchanges $22_1$ to $22_N$ is an answer-phone-startup request as the determined result at step 60, the access controlling portion 52 turns on the answer-phone-startup information stored in the portable telephone position storing portion 50 corresponding to the sender side telephone number contained in the request signal (at step S61). Thereafter, the access controlling portion 52 obtains voice-guidance information corresponding to the answer-phone-startup request from the guidance information storing portion 53. An example of the voice-guidance information is "Answer phone service will start right now". The access controlling portion 52 notifies the portable telephone unit that has issued the answer-phone-startup request that the access controlling portion 52 had accepted the answer-phone-startup request (at step S62). Thereafter, the access controlling portion 52 waits for various requests (namely, the flow returns to the beginning of the process).

When the request signal is an answer-phone-reproducing request rather than an answer-phone-startup request as the determined result at step S60 (namely, the determined result at step S60 is No; and the determined result at step S63 is Yes), the access controlling portion 52 causes the searching portion 51 to search for the Internet-answer-phone-transferring-function-unit-connection information from the portable telephone position storing portion 50 with the key of the sender side telephone number contained in the request signal (at step S64). In addition to the answer phone reproducing request, the access controlling portion 52 transmits the obtained Internet-answer-phone-transferring-function-unit-connection information to the exchange connected to the portable telephone unit that has issued the answer-phone-reproducing request (at step S65). Thereafter, the access controlling portion 52 waits for various requests (namely, the flow returns to the beginning of the process).

When the request signal is not an answer-phone-reproducing request as the determined result at step S63 (namely, the determined result at step S63 is No), the access controlling portion 52 causes the searching portion 51 to search for answer-phone-startup information from the portable telephone position storing portion 50 with a key of the receiver side telephone number contained in the request signal (at step S66). When the answer-phone-startup information corresponding to the portable telephone number of the receiver side portable telephone unit has been turned on (namely, the determined result at step S67 is Yes), the access controlling portion 52 determines that the receiver side portable telephone unit has setup the answer phone on mode. In addition to the answer-phone-recording request, the access controlling portion 52 transmits the obtained Internet-answer-phone-transferring-function-unit-connection information to the exchange that has issued the request to call (at step S68). Thereafter, the access controlling portion 52 waits for various requests (namely, the flow returns to the beginning of the process).

When the answer-phone-startup information has been turned off as the determined result at step S67 (namely, the determined result at step S67 is No), the access controlling portion 52 determines that the request signal is a registered-position-searching request corresponding to a normal origination call. Thereafter, the access controlling portion 52 causes the searching portion 51 to search for registered-position information from the portable telephone position storing portion 50 with a key of the receiver side telephone number contained in the request signal and transmits the obtained registered-position information to the exchange that has issued the request to call (at step S69). Thereafter, the access controlling portion 52 waits for various requests (namely, the flow returns to the beginning of the process).

When the answer-phone-reproducing request has been received or the answer-phone-startup information of the receiver side portable telephone unit has been turned on, the portable telephone position storing unit 25 transmits the Internet-answer-phone-transferring-function-unit-connection information to the exchange that has issued the request so as to connect the exchange and an Internet answer phone-transferring function unit adjacent thereto.

FIG. 9 shows an outlined structure of a principal portion of the first Internet answer phone-transferring function unit $21_1$ according to the embodiment. For simplicity, only the first Internet answer phone-transferring function unit $21_1$ will be explained. However, it should be noted that the structure of the first Internet answer phone-transferring function unit 211 is the same as that of each of the second to N-th Internet answer phone-transferring function units $21_2$ to $21_N$. The first Internet answer phone-transferring function unit $21_1$ has a call processing portion $70_1$, an answer-phone information storing portion $71_1$, and a guidance information storing portion $72_1$. The call processing portion $70_1$ performs a call process with the first exchange $22_1$ connected to the first Internet answer phone-transferring function unit $21_1$. The answer-phone information storing portion $71_1$ stores a voice message as answer-phone information. The guidance information storing portion $72_1$ stores voice-guidance information that is issued when answer-phone information is registered with the answer-phone information storing portion $71_1$. The first Internet answer phone-transferring function unit $21_1$ according to the embodiment is connected to the Internet through an Internet interface (IF) portion $73_1$. In addition, the first Internet answer phone-transferring function unit $21_1$ has a searching portion $74_1$ and a packet generating portion $75_1$. The searching portion $74_1$ searches for registered information from the answer-phone information storing portion $71_1$ when the Internet IF portion $73_1$ receives a predetermined request packet through the Internet. The packet generating portion $75_1$ transmits predetermined packets to the Internet through the Internet IF portion $73_1$.

FIG. 10 shows an outline of answer-phone information stored in the answer-phone information storing portion $71_1$. Answer-phone information 76 has a sender side telephone number field, a receiver side telephone number field, an answer-phone information field, and an additional information field. Each entry of the answer-phone information 76 has a sender side telephone number 77, a receiver side telephone number 78, answer phone answer-phone information 79, and additional information 80. The sender side telephone number 77 represents the sender of answer-phone information. The receiver side telephone number 78 represents the receiver of the answer-phone information. The answer-phone information 79 is a voice message of the answer-phone information. The additional information 80 represents time information at which a voice message as the answer-phone information was recorded.

When the first Internet answer phone-transferring function unit $21_1$ receives an answer-phone-recording request from the first portable telephone unit $24_1$ through the first exchange $22_1$, the first Internet answer phone-transferring function unit $21_1$ stores a voice message received from the first portable telephone unit $24_1$. When the first Internet answer phone-transferring function unit $21_1$ receives an answer-phone-reproducing request through the first exchange $22_1$, if the answer-phone information storing portion $71_1$ has stored answer-phone information, the first Internet answer phone-transferring function unit $21_1$ reproduces the audio message and transmits it to the first portable telephone unit $24_1$ using a communication path through the first exchange $22_1$. When the first Internet answer phone-transferring function unit $21_1$ receives the answer-phone-reproducing request through the first exchange $22_1$, the first Internet answer phone-transferring function unit $21_1$ also transmits search request packets to all other Internet answer phone-transferring function units so as to cause them to search for answer-phone information. When the other Internet answer phone-transferring function units have respective answer-phone information, the first telephone answer phone-transferring function unit $21_1$ collects the answer-phone information from the Internet answer phone-transferring function units having the information through the Internet. The first Internet answer phone-transferring function unit $21_1$ reproduces voices from the collected answer-phone information and transmits them to the first portable telephone unit $24_1$ through the first exchange $22_1$ that has issued the request using a communication path that connects the first portable telephone unit $24_1$ and the Internet answer phone-transferring function unit $21_1$. The first Internet answer phone-transferring function unit $21_1$ has a CPU (not shown) that performs such a controlling process. The CPU executes various controlling processes corresponding to a program stored in a predetermined recordable medium such as a ROM.

FIG. 11 shows an outline of a controlling process of a controlling program of the first Internet answer phone-transferring function unit $21_1$ corresponding to various requests received from the first exchange $22_1$. These requests may be request signals that have a predetermined format and are transmitted through a dedicated line. Alternatively, the request signals may have the signal format shown in FIG. 5. In any case, these signals are not limited as long as various requests can be distinguished from one another. In this example, it is assumed that various signals that have the signal format shown in FIG. 5 are transmitted and received between the first exchange $22_1$ and the first Internet answer phone-transferring function unit $21_1$. The call processing portion $70_1$ references the signal type field of a request signal. When the request signal that has been received from the first exchange $22_1$ is an answer-phone-recording request (namely, the determined result at step S81 is Yes), the call processing portion $70_1$ transmits voice-guidance information that has been stored in the guidance information storing portion $72_1$ to the first portable telephone unit $24_1$ corresponding to the answer-phone-recording request (at step S82). An example of the voice-guidance information is "This telephone is currently in answer phone on mode. After a beep-sound, please leave your message." Thereafter, in addition to the receiver side telephone number and the request time, the call processing portion $70_1$ stores the voice message received from the first portable telephone unit $24_1$ (at step S83). Thereafter, the call processing portion $70_1$ waits for various requests (namely, the flow returns to the beginning of the process).

When the request signal that has been received at step S81 is an answer-phone-reproducing request rather than an answer-phone-recording request (namely, the determined result at step S81 is No; and the determined result at step S84 is Yes), the call processing portion $70_1$ searches for answer-phone information corresponding to the receiver side telephone number from answer-phone information stored the answer-phone information storing portion $71_1$ with a key of the sender side telephone number contained in the request (at step S85). When registered information has been obtained from the answer-phone information storing portion $71_1$, the call processing portion $70_1$ reproduces the answer-phone information and transmits it to the first portable telephone unit $24_1$ that has issued the request. According to the embodiment, since the first exchange $22_1$ accommodates only the first portable telephone unit $24_1$, answer-phone information of other portable telephone units has not been recorded to the answer-phone information storing portion $71_1$. However, when the portable telephone unit $24_1$ has moved to another radio area and is managed by another radio base station, answer-phone information that had been registered may be left in the answer-phone information storing portion $71_1$.

Thereafter, the packet generating portion $75_1$ generates predetermined packets with the sender side telephone number contained in the request signal (at step S86). The Internet IF portion $73_1$ broadcasts the generated packets to all the Internet answer phone-transferring function units so as to cause them to search the respective answer-phone information storing portions for answer-phone information corresponding to the receiver side telephone number which is identical with the sender side telephone number contained in the request packets (at step S87).

Figure 12:
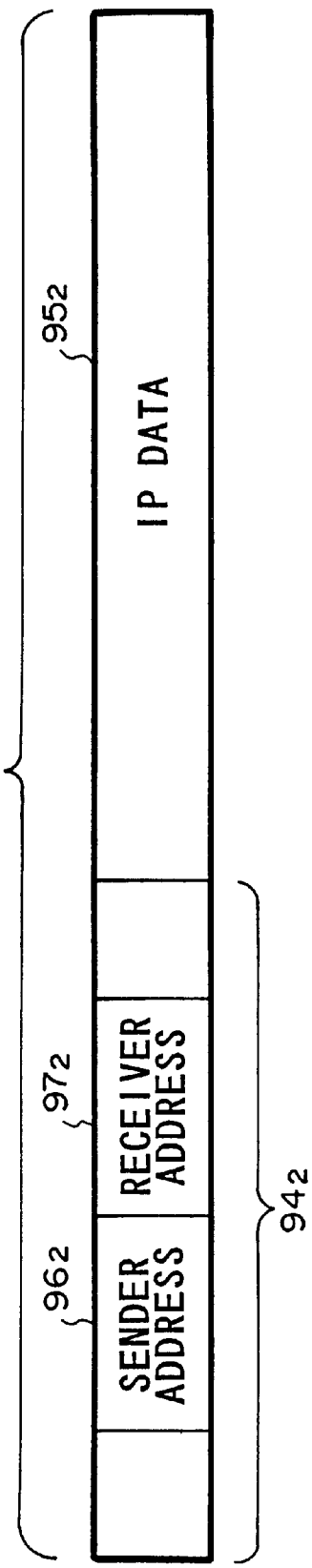
FIG. 12 is a schematic diagram for explaining an example of the format of a request packet according to the embodiment of the present invention.

FIG. 12 shows an example of the format of the request packets. The request packets are packets defined in conformity with the TCP/IP protocol. IP datagram $93_2$ shown in FIG. 12 is composed of an IP header field $94_2$ and an IP data field $95_2$. The IP header field $94_2$ has a sender address $96_2$ and a receiver address 972 that are IP addresses uniquely assigned to the first to N-th Internet answer phone-transferring function units $21_1$ to $21_N$ connected to the Internet 20. The IP data field $95_2$ has various types of information such as an identifier that represents the type of a request packet and a key for a search that are transmitted through the Internet 20.

Returning to FIG. 11, at step S87, all the Internet answer phone-transferring function units that have received request packets transmitted in the broadcasting mode search the respective answer-phone information storing portions for answer-phone information corresponding to the receiver side telephone number which is identical with the sender side telephone number contained in the request packets. When the answer-phone information corresponding to the receiver side telephone number which is identical with the sender side telephone number contained in the request packets has been obtained, the relevant Internet answer phone-transferring function unit transmits response packets corresponding to the request packets to the first Internet answer phone-transferring function unit $21_1$. After first Internet answer phone-transferring function unit $21_1$ transmits request packets in the broadcasting mode, it waits for response packets corresponding the request packets (at step S88). When the first Internet answer phone-transferring function unit $21_1$ has received response packets that represent that answer-phone information had been registered (namely, the determined result at step S88 is Yes), the first Internet answer phone-transferring function unit $21_1$ receives answer-phone information (at step S89). The first Internet answer phone-transferring function unit $21_1$ reproduces voices from the answer-phone information and transmits the voices to the first portable telephone unit $24_1$ through the first exchange $22_1$ (at step S90). Thereafter, the first Internet answer phone-transferring function unit $21_1$ waits for various requests (namely, the flow returns to the beginning of the process).

When the received request signal is not an answer-phone-reproducing request as the determined result at step S84 (namely, the determined result at step S84 is No) or when no response packets corresponding to the request packets transmitted in the broadcasting mode have been received as the determined result at step S88 (namely, the determined result at step S88 is No), the first Internet answer phone-transferring function unit $21_1$ waits for various requests (namely, the flow returns to the beginning of the process).

FIG. 13 shows an outline of a controlling process of the first Internet answer phone-transferring function unit $21_1$ in the case that a request packet is transmitted from one of the second to N-th Internet answer phone-transferring function units $21_2$ to $21_N$ to the first Internet answer phone-transferring function unit $21_1$. The Internet IF portion $73_1$ of the first Internet answer phone-transferring function unit $21_1$ monitors request packets received from the second to N-th Internet answer phone-transferring function units $21_2$ to $21_N$ (namely, the determined result at step S96 is No). When the Internet IF portion $73_1$ has received request packets (namely, the determined result at step S96 is Yes), the Internet IF portion $73_1$ causes the searching portion $74_1$ to search the answer-phone information storing portion for answer-phone information corresponding to the receiver side telephone number which is identical with the sender side telephone number contained in the request packets (at step S97). When the answer-phone information corresponding to the receiver side telephone number which is identical with the sender side telephone number contained in the request packets has been obtained (namely, the determined result at step S98 is Yes), the Internet IF portion $73_1$ causes the packet generating portion $75_1$ to generate response packets corresponding to the request packets with the sender address contained therein. The Internet IF portion $73_1$ transmits the response packets to the Internet 20 (at step S99). Thereafter, the Internet IF portion $73_1$ monitors request packets (namely, the flow returns to the beginning of the process). When the answer-phone information corresponding to the receiver side telephone number which is identical with the sender side telephone number contained in the request packets has not been obtained (namely, the determined result at step S98 is No), the Internet IF portion $73_1$ monitors request packets (namely, the flow returns to the beginning of the process).

Next, with reference to sequence diagrams shown in FIGS. 14 and 15, the answer phone startup operation of the answer phone system according to the embodiment of the present invention will be explained.

FIG. 14 shows an outline of a flow of the answer phone startup operation of the answer phone system according to the embodiment. In this example, the first portable telephone unit $24_1$ is sets up to the answer phone on mode as a result. When the user of the first portable telephone unit $24_1$ inputs a predetermined telephone number "1411" corresponding to an answer-phone-startup request with a telephone number inputting portion, the answer phone startup telephone number 100 is input as an answer phone startup telephone number 101 to the first exchange $22_1$ through the first radio base station $23_1$. When the answer phone startup telephone number 101 has been input to the first exchange $22_1$, it determines that the request is an answer-phone-startup request as shown in FIG. 4 and transmits the request as an answer-phone-startup request 102 to the portable telephone position storing unit 25.

When the portable telephone position storing unit 25 has received the answer-phone-startup request 102, the portable telephone position storing unit 25 turns on the answer-phone-startup information stored corresponding to the sender side telephone number contained in the answer-phone-startup request 102 as shown in FIG. 8 (answer phone start setup 103). Corresponding to the answer-phone-startup information, a communication path between the first portable telephone unit $24_1$ that has been set up to the answer phone on mode and the portable telephone position storing unit 25 is established. Thereafter, the portable telephone position storing unit 25 transmits a voice guidance 104 to the first exchange $22_1$. An example of the voice guidance 104 is "The answer phone service will start right now". The guidance 104 is transmitted to the first radio base station $23_1$ (guidance 105). Thereafter, the guidance 105 is transmitted to the first portable telephone unit $24_1$ that has issued the answer-phone-startup request 102 (guidance 106). Thereafter, the portable telephone position storing unit 205 disconnects the communication path with the first portable telephone unit $24_1$ that has issued the answer phone startup request.

FIG. 15 shows an outline of a flow of operations of an answer-phone-recording request and an answer-phone-reproducing request according to the embodiment of the present invention. In this example, as shown in FIG. 14, the first portable telephone unit $24_1$ has been set up to the answer-phone on mode. When the N-th portable telephone unit $24_N$ originates a call to the first portable telephone unit $24_1$, the call 107 is input as an origination call 108 to the N-th exchange $22_N$. When the N-th exchange $22_N$ has received the origination call 108, the N-th exchange $22_N$ inquires of the portable telephone position storing unit 25 if the receiver side portable telephone unit has been set up to the answer phone on mode (inquiry request 109). The portable telephone position storing unit 25 searches for registered information from the portable telephone position storing portion 50 with a key of the receiver side telephone number contained in the inquiry request 109 (search 110). Since the answer-phone-startup information corresponding to the telephone number of the first portable telephone unit $24_1$ has been turned on as shown in FIG. 14, the Internet-answer-phone-transferring-function-unit-connection information corresponding to the telephone number of the first portable telephone unit $24_1$ is obtained as shown in FIG. 8. The Internet-answer-phone-transferring-function-unit-connection information is transmitted to the N-th exchange $22_N$ along with the answer-phone-recording request (answer-phone-recording request 111). The Internet-answer-phone-transferring-function-unit-connection information is connection information to connect the N-th exchange $22_N$ to the N-th Internet answer phone-transferring function unit $21_N$.

The N-th exchange $22_N$ that has received the answer-phone-startup request 111 transmits a connection request 112 to the N-th Internet answer phone-transferring function unit $21_N$ corresponding to the Internet-answer-phone-transferring-function-unit-connection information received along with the answer-phone-recording request as shown in FIG. 4. Thus, a communication path is established between the N-th exchange $22_N$ and the N-th Internet answer phone-transferring function unit $21_N$. As a result, a communication path is established between the N-th portable telephone unit $24_N$ and the N-th Internet answer-phone transferring unit $21_N$. Thereafter, as shown in FIG. 11, the N-th Internet answer phone-transferring function unit $21_N$ transmits a guidance 113 (that has been registered) to the N-th exchange $22_N$. The guidance 113 is transmitted as a guidance 114 from the N-th exchange $22_N$ to the N-th radio base station $23_N$. Thus, the N-th radio base station $23_N$ transmits the guidance 114 as a guidance 115 to the N-th portable telephone unit $24_N$. Thereafter, a voice message that has been input from the N-th portable telephone unit $24_N$ is transmitted to the N-th Internet answer phone-transferring function unit $21_N$ through the connected communication path (answer phone communication 116). Thereafter, the voice message is stored to the answer-phone information storing portion of the N-th Internet answer phone-transferring function unit $21_N$ along with the sender side telephone number, the receiver side telephone number, and the answer-phone information recorded time (answer phone recording 117). After the answer phone recording operation has been completed, the N-th portable telephone unit $24_N$ issues a disconnection request to the N-th Internet answer-phone transferring unit $21_N$. Thus, the connected communication path is disconnected (disconnection requests 118, 119, and 120).

In such a manner, the answer-phone information addressed from the N-th portable telephone unit $24_N$ to the first portable telephone unit $24_1$ is registered with the N-th Internet answer phone-transferring function unit $21_N$. Likewise, the answer-phone information addressed from the M-th portable telephone unit $24_N$ to the first portable telephone unit $24_1$ is registered with the M-th Internet answer phone-transferring function unit $21_M$.

Next, it is assumed that in the state that answer-phone information addressed from the M-th and N-th portable telephone units $24_M$ and $24_N$ to the first portable telephone unit $24_1$ has been registered with the M-th and N-th Internet answer phone-transferring function units $21_M$ and $21_N$, respectively, an answer-phone-reproducing request is issued from the first portable telephone unit $24_1$. In other words, when a predetermined telephone number "1417" corresponding to the answer-phone-reproducing request is input from the telephone number inputting portion of the first portable telephone unit $24_1$, the answer-phone-reproducing request telephone number 121 is transmitted as an answer-phone-reproducing request 122 to the first exchange $22_1$ through the first radio base station $23_1$. The first exchange $22_1$ determines that the input request is an answer-phone-reproducing request and transmits it as an answer-phone-reproducing request 123 to the portable telephone position storing unit 25.

When the portable telephone position storing unit 25 has received the answer-phone-reproducing request 123, the portable telephone position storing unit 25 searches the portable telephone position storing portion 50 with a key of the sender side telephone number contained in the answer-phone-reproducing request and obtains the Internet-answer-phone-transferring-function-unit-connection information from the portable telephone position storing portion 50 corresponding to the sender side telephone number (search 124). The Internet-answer-phone-transferring-function-unit-connection information is connection information which connects the first exchange $22_1$ to the first Internet answer phone-transferring function unit $21_1$. The obtained Internet-answer-phone-transferring-function-unit-connection information is transmitted to the first exchange $22_1$ along with the answer-phone-reproducing request 125.

When the first exchange $22_1$ has received the answer-phone-reproducing request 125, the first exchange $22_1$ transmits a connection request 126 to the first Internet answer phone-transferring function unit $21_1$ corresponding to the Internet-answer-phone-transferring-function-unit-connection information received along with the answer phone reproducing request as shown in FIG. 4. Thus, a communication path is established between the first exchange $22_1$ and the first Internet answer phone-transferring function unit $21_1$. As a result, a communication path is established between the first portable telephone unit $24_1$ and the first Internet answer phone-transferring function unit $21_1$.

Thereafter, the first Internet answer phone-transferring function unit $21_1$ searches the answer-phone information storing portion $71_1$ for answer-phone information corresponding to the receiver side telephone number which is identical with the sender side telephone number contained in the received reproducing request and obtains the answer-phone information (at step S85). When the first Internet answer phone-transferring function unit $21_1$ has obtained answer-phone information corresponding to the receiver side telephone number which is identical with the sender side telephone number contained in the received reproducing request, the first Internet answer phone-transferring function unit $21_1$ reproduces a voice from the answer-phone information and transmits the voice to the first portable telephone unit $24_1$ that has issued the answer phone reproducing request. According to the embodiment, since only the first portable telephone unit $24_1$ is accommodated in the first exchange $22_1$, answer-phone information of other portable telephone units has not been registered. However, when the portable telephone unit is moved to another radio area and managed by another radio base station, answer-phone information that has been registered before the portable telephone unit has been moved may be left. In this case, the packet generating portion $75_1$ generates request packets with the sender side telephone number contained in the received reproducing request. The Internet IF portion $73_1$ broadcasts the request packets to all other Internet answer phone-transferring function units (broadcast 127).

FIG. 15 shows the case that request packets are transmitted (broadcast) from the first Internet answer phone-transferring function unit $21_1$ to the M-th and N-th Internet answer phone-transferring function units $21_M$ and $21_N$. When the M-th and N-th Internet answer phone-transferring function units $21_M$ and $21_N$ have received the request packets, they search for answer-phone information corresponding to the receiver side telephone number which is identical with the sender side telephone number contained in the received request packets (searches 128 and 129). As explained above, since answer-phone information addressed from the M-th and N-th portable telephone units $24_M$ and $24_N$ to the first portable telephone unit $24_1$ has been registered with the M-th and N-th Internet answer phone-transferring function units $21_M$ and $21_N$, respectively, response packets that represent that answer-phone information has been registered are transmitted through the Internet 20 (response 130). When the first Internet answer phone-transferring function unit $21_1$ receives the response packets, it receives answer-phone information in the method as shown in FIG. 11. The first Internet answer phone-transferring function unit $21_1$ reproduces voices from the answer-phone information and transmits the voices to the first portable telephone unit $24_1$ through the first exchange $22_1$ (answer phone reproductions 131, 132, and 133).

In the answer phone system according to the embodiment, an exchange that accommodates portable telephone units is connected to an Internet answer phone-transferring function unit and a portable telephone position storing unit 25. The Internet answer phone-transferring function unit is connected to the Internet 20. The portable telephone position storing unit 25 stores registered-position information, answer-phone-startup information, and the Internet-answer-phone-transferring-function-unit-connection information for each portable telephone unit. When a sender side portable telephone unit originates a call to a receiver side portable telephone unit, the answer phone system references the portable telephone position storing unit 25. When the answer phone system has determined that the answer phone on mode has been set up in the receiver side portable telephone unit, the answer phone system causes an Internet answer phone-transferring function unit connected to the exchange that manages the sender side portable telephone unit to store answer-phone information. Thus, since the sender side portable telephone unit is connected to the exchange that manages it, it is avoided that the user is charged for an expensive communication fee corresponding to the distance from the portable telephone unit to the conventional remote answer phone unit through the public telephone network.

In addition, when a portable telephone unit intends to reproduce answer-phone information, the answer phone system causes the local Internet answer phone-transferring function unit connected to the exchange that manages the portable telephone unit to generate request packets that cause all other (remote) Internet answer phone-transferring function units to search for the answer-phone information addressed to the portable telephone unit. In this case, the local Internet answer phone-transferring function unit broadcasts the request packets to all other Internet answer phone-transferring function units. When the remote Internet answer phone-transferring function units receive the request packets, they search for answer-phone information corresponding to the telephone number of the portable telephone unit that has issued the answer phone reproducing request. When any one of the remote Internet answer phone-transferring function units has obtained the relevant answer-phone information, it transmits response packets to the Internet 20. When the local Internet answer phone-transferring function unit that has transmitted the request packets, it collects the answer-phone information addressed to the portable telephone unit which has transmitted the answer phone reproduction request from the remote Internet answer phone-transferring function unit that has obtained the answer-phone information through the Internet 20 and reproduces a voice from the answer-phone information.

In order to obtain a voice message, the portable telephone unit is connected to an Internet answer phone-transferring function unit adjacent thereto. Thus, it is avoided that the user is charged for an expensive communication fee corresponding to the distance from the portable telephone unit to the conventional remote answer phone unit through the public telephone network. When a voice message is reproduced, since packets are used, a vacant transmission channel is not generated. Thus, the information transmission efficiency can be prevented from deteriorating. Data are transmitted to only an Internet answer phone-transferring function unit that collets answer-phone information but data are not transmitted from the Internet answer phone-transferring function unit that collets answer-phone information. Thus, each Internet answer phone-transferring function unit can transmit a call with around half data traffic as compared with bidirectional communication. Consequently, the Internet can be prevented from congesting. As a result, the efficiency of the information transmission can be remarkably improved. Against a future increase of subscribers of portable telephone units, the quality of the answer phone service can be maintained. In addition, since answer-phone information is collected through the Internet, the cost of the line facility can be suppressed. Although the use of the conventional audio compressing/decompressing technologies for the digital portable telephone system is one alternative, if exchanges for use do not have a data-through mode, the audio compressing/decompressing technologies dedicated for the Internet should be used. However, in each case, the amount of bits to be transmitted can be remarkably reduced.

[Modification]

In the answer phone system according to the embodiment, voice information stored in each Internet answer phone-transferring function unit is collected through the Internet and then reproduced. However, recent portable telephone units are expected to operate as information terminal units having advanced functions for displaying characters as well as conventional telephone functions. Thus, when an Internet answer phone-transferring function unit connected to the Internet has an extractor that extracts a sender side telephone number and an answer-phone information recorded time from a response packet and a sender that sends the extracted information to a portable telephone unit used as an information terminal unit, a portable telephone unit receives such information and displays it. The user can know the sender side telephone number and the recorded time of answer-phone information through the monitor without annoying others when he or she is in a public transportation such as a train. In addition, when such a portable telephone unit is used together with a car navigation system (or a GPS system), the user can know the sender side telephone number and the recorded time of answer-phone information on the display of the car navigation system in a car.

When a portable telephone unit has function for storing packets from the Internet and an information terminal unit connected thereto has a function for detecting facsimile information and a function for automatically detecting a transmission protocol and a transmission rate, various information communications for an e-mail and a facsimile as well voice information can be realized. Thus, a system having versatility can be realized. When Internet answer phone-transferring function units are distributed to various locations, the load can be also distributed. In addition, the storage capacity of data transmitted through the Internet can be distributed. Thus, a system that prevents a trouble from propagating in a wide range can be realized.

In the embodiment and the modification, an answer phone function for portable telephone units through a radio base station was explained. However, the present invention is not limited to such an embodiment and such a modification. However, since each portable telephone unit performs a conventional registered-position information collecting process, the system cost can be suppressed by modifying the process.

In the above-explained embodiment and modification, answer-phone information is collected through the Internet. However, the present invention is not limited to such an embodiment and such a modification as long as a packet communication network is used to collect answer-phone information. In this case, since it is not necessary to use conventional lines but a packet communication network, even when reproduction of a voice message which accompanies a one-way communication is executed, the transmission efficiency is not deteriorated.

An exchange may transmit an answer-phone-startup request to a portable telephone position storing unit when the exchange recognizes a specific value in a receiver side telephone number 33 contained in a call from a portable telephone unit. Alternatively, the exchange may transmit an answer-phone-startup request to the portable telephone position storing unit when the exchange detects that the power of the portable telephone unit is turned off or when there is no exchange that detects the presence of the portable telephone unit in the area that the corresponding radio base station manages.

In the above embodiment, the portable telephone position storing unit 25 transmits, when an answer-phone-reproducing request is received, the Internet-answer-phone-transferring-function-unit-connection information that is answer-phone information is transmitted. Alternatively, only when the answer-phone-startup information has been turned on, connection information may be transmitted. In this case, the traffic can be reduced. As another alternative method, the portable telephone position storing portion 50 may have a reproduction completion flag that represents the presence/absence of answer-phone information to be reproduced. With the flag, connection information may be transmitted. Thus, the traffic can be further reduced.

According to the embodiment, the portable telephone position storing unit 25 stores the Internet-answer-phone-transferring-function-unit-connection information 59. Alternatively, each exchange may store the Internet-answer-phone-transferring-function-unit-connection information 59. In this case, since each exchange is connected to a fixed Internet answer phone-transferring function unit, the system can be simplified and a traffic between each exchange and the portable telephone position storing unit 25 may be reduced. In addition, if an exchange transmits an answer-phone-startup request to a portable telephone position storing unit only when the exchange recognizes a specific value in a receiver side telephone number 33 contained in a call from a portable telephone unit, the traffic between each exchange and the portable telephone position storing unit 25 may be further reduced because the number of portable telephone units for which the answer phone mode are turned on is reduced.

Although the present invention has been shown and explained with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method for transferring a recorded telephone message using a packet network in which data are transferred in packets of defined format and to which are connected a plurality of transfer units that are each associated with respective exchanges, the method comprising the steps of:

receiving at a first of the exchanges a first message from a first telephone that is addressed to a second telephone and that is to be recorded for replay;

recording the first message at a first of the transfer units that is associated with the first exchange;

receiving at a second of the exchanges a retrieve request from the second telephone to retrieve recorded messages addressed to the second telephone, and transferring the retrieve request to a second of the transfer units associated with the second exchange;

after receiving the retrieve request, broadcasting from the second transfer unit to the plurality of transfer units over the packet network, a replay request for messages addressed to the second telephone;

transmitting the first message over the packet network from the first transfer unit only after receipt of the replay request from the second transfer unit; and receiving the first message at the second transfer unit and replaying the first message at the second exchange for the second telephone.

2. The method of claim 1, further comprising the steps of receiving at a third of the exchanges a second message from a third telephone that is addressed to the second telephone and that is to be recorded for replay, recording the second message at a third of the transfer units that is associated with the third exchange, transmitting the second message over the packet network from the third transfer unit only after receipt of the replay request from the second transfer unit, and receiving the second message at the second transfer unit and replaying the second message at the second exchange for the second telephone.

3. A system for transferring a recorded telephone message using a packet network in which data are transferred in packets of defined format, the system comprising:
- a plurality of transfer units that are connected to the packet network and that are each associated with a respective one of plural exchanges;
- means for receiving at said exchanges telephone messages that are addressed to a receiving telephone and that are to be recorded for replay;
- means for recording the telephone messages at respective ones of said transfer units that are each associated with respective ones of said exchanges that receive the telephone messages;
- means for receiving at said exchanges a retrieve request from the receiving telephone to retrieve recorded messages addressed to the receiving telephone, and for transferring said retrieve request to a respective one of said transfer units that is associated with the one of said exchanges that receives said retrieve request;
- means for broadcasting from the one of said transfer units that receives said retrieve request to said plurality of transfer units over the packet network, a replay request for messages addressed to the receiving telephone, after receiving said retrieve request;
- means for transmitting the telephone messages over the packet network from one of said transfer units at which the telephone messages are recorded, only after receipt of said replay request from the one of said transfer units that broadcast said replay request; and
- means for receiving the telephone message at the one of said transfer units that broadcast said replay request and replaying the telephone message at the one of said exchanges that received said retrieve request.

* * * * *